United States Patent
Magarida et al.

(10) Patent No.: US 9,448,299 B2
(45) Date of Patent: Sep. 20, 2016

(54) INFORMATION ASSOCIATION SYSTEM

(75) Inventors: Naofumi Magarida, Sunto-gun (JP); Atsushi Mizutani, Mishima (JP); Yuta Oshiro, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/391,852

(22) PCT Filed: Apr. 20, 2012

(86) PCT No.: PCT/JP2012/060723
§ 371 (c)(1),
(2), (4) Date: Oct. 10, 2014

(87) PCT Pub. No.: WO2013/157136
PCT Pub. Date: Oct. 24, 2013

(65) Prior Publication Data
US 2015/0105100 A1    Apr. 16, 2015

(51) Int. Cl.
| | | |
|---|---|---|
| H04W 4/02 | (2009.01) | |
| G01S 5/02 | (2010.01) | |
| H04M 1/60 | (2006.01) | |
| G01L 1/00 | (2006.01) | |
| G01P 15/00 | (2006.01) | |
| H04M 1/725 | (2006.01) | |

(52) U.S. Cl.
CPC .............. *G01S 5/0284* (2013.01); *G01L 1/00* (2013.01); *G01P 15/00* (2013.01); *H04M 1/6075* (2013.01); *H04M 1/7253* (2013.01)

(58) Field of Classification Search
CPC .............................. H04W 4/027; H04W 4/028
USPC ............ 340/457, 505, 523, 524, 528, 539.11
See application file for complete search history.

(56) References Cited

U.S. PATENT DOCUMENTS

| | | | | |
|---|---|---|---|---|
| 2009/0312909 | A1 | 12/2009 | Onuma | |
| 2012/0015665 | A1* | 1/2012 | Farley | G01S 5/0036 455/456.1 |
| 2013/0012123 | A1* | 1/2013 | DeLuca | A45C 13/18 455/39 |

FOREIGN PATENT DOCUMENTS

| | | |
|---|---|---|
| JP | 2008-87533 | 4/2008 |
| JP | 2011-148425 | 8/2011 |
| JP | 2011-172195 | 9/2011 |

OTHER PUBLICATIONS

International Search Report issued Jul. 10, 2012, in PCT/JP12/060723 filed Apr. 20, 2012.

\* cited by examiner

*Primary Examiner* — Kevin Kim
(74) *Attorney, Agent, or Firm* — Oblon, McClelland, Maier & Neustadt, L.L.P

(57) ABSTRACT

An information association system for identifying a mobile terminal owned by a driver accurately is disclosed. The information association system is allowed to communicate with the mobile terminal and sensors arranged in a vehicle, and configured to identify the mobile terminal owned by the driver based on information about a detected signals transmitted form the mobile terminal(s) and sensor(s).

16 Claims, 17 Drawing Sheets

INFORMATION ASSOCIATION SYSTEM

TECHNICAL FIELD

The present invention relates to a system for identifying a mobile terminal brought into an automobile by a driver.

BACKGROUND ART

In the prior art, the presence of a mobile phone brought into an automobile is determined by various methods utilizing an interactive communication function. Meanwhile, the presence of a vehicle occupant can be determined by a sensor attached to a door or arranged in a vehicle interior, and arts of identifying a driver in the vehicle is also known in the art. In recent days, an art of identifying a mobile phone owned by a driver has been developed by combining those arts.

For example, Japanese Patent Laid-Open No. 2011-148425, describes an information correlation device comprised of a driver detection sensor for detecting a driver by an image processing or a fingerprint authentication, a passenger detection sensor for detecting passengers taking seats, and a mobile phone detection sensor for detecting a radio wave transmitted from the mobile phone brought into the vehicle. The information correlation device detects a fact that the mobile phone is brought into the vehicle based on signals transmitted from the passenger detection sensor and the mobile phone detection sensor.

Specifically, the information correlation device taught by Japanese Patent Laid-Open No. 2011-148425 is configured to identify the driver detected by the driver detection sensor, and to identify information of the mobile phone in the history information stored in a storage that has ever been associated with the driver. Thus, the information correlation device of Japanese Patent Laid-Open No. 2011-148425 identifies the driver's mobile phone with reference to the history information of the mobile phones brought into the vehicle that is stored in the storage. However, if the mobile phone is thus identified based only on the history information, the mobile phone of the driver may not be identified accurately.

DISCLOSURE OF THE INVENTION

The present invention has been conceived noting the foregoing technical problem, and it is an object of the present invention to improve accuracy of identifying a mobile phone owned by a driver from among mobile phones brought into a vehicle interior.

The information association system of the present invention is allowed to communicate with a mobile terminal having an acceleration sensor, and a pressure sensor arranged in a seat of a vehicle. In order to achieve the above-explained object, according to the present invention, the information association system is provided with an identifying means that identifies the mobile terminal brought into the vehicle as a driver's possession, based on information about a detected communication signal transmitted from the mobile terminal in response to an output signal of the acceleration sensor, and information about a detected pressure signal transmitted form the pressure sensor.

Specifically, the identifying means is configured to identify the mobile terminal as a driver's possession based on a fact that an interval between a detection time of the communication signal transmitted from the mobile terminal and a detection time of the pressure signal is shorter than a predetermined threshold value.

The detection time includes a time point at which the communication signal or the pressure signal is received, and a time point at which acceleration is detected by the acceleration sensor or a pressure is detected by the pressure sensor.

The information association system is further comprised of a storage means configured to store history information including information about the mobile terminal identified by the identifying means as the driver's possession. In addition, the identifying means identifies the mobile terminal as a driver's possession based on the information about the communication signal, the information about the pressure signal, and the history information stored in the storage means.

The information association system is further comprised of: a storage means configured to store history information including information about the mobile terminal identified by the identifying means as the driver's possession; and a first weighting means configured to weight a threshold value to be compared with the communication signal by a predetermined weight, if the information about the mobile terminal transmitted the communication signal is available in the storage means. In addition, the identifying means is further configured to identify the mobile terminal as a driver's possession based on a fact that the interval between the detection time of the communication signal transmitted from the mobile terminal and the detection time of the pressure signal is shorter than the threshold value weighted by the first weighting means.

The identifying means is further configured to identify the mobile terminal as a driver's possession based on a fact that the interval between the detection time of the communication signal transmitted from the mobile terminal and the detection time of the pressure signal is shorter than the predetermined threshold value, if only one communication signal is detected.

The identifying means is further configured to identify the mobile terminal as a driver's possession based on a fact that the mobile terminal transmits the communication signal detected at the time point closest to the time point at which the pressure signal is detected so that an interval therebetween is shortest from among a plurality of intervals between each detected communication signal and the pressure signal shorter than the threshold value.

The information association system is further comprised of: a storage means configured to store history information including information about the mobile terminal identified by the identifying means as the driver's possession; and a second weighting means configured to weight the interval by a predetermined weight based on the information about the mobile terminal transmitted the communication signal and the history information stored in the storage means. In addition, the identifying means is further configured to identify the mobile terminal as a driver's possession based on a fact that the interval weighted by the second weighting means is shorter than the predetermined threshold value.

Specifically, the second weighting means divides the interval between the detection times of the communication signal and the pressure signal by a number of times the mobile terminal transmitted the communication signal has been identified as a driver's possession, if the information about the mobile terminal transmitted the communication signal is available in the storage means.

For example, the pressure signal is the output signal of the pressure sensor arranged in s driver seat of the vehicle.

The pressure signal includes a first pressure signal transmitted from the pressure sensor arranged in a driver seat of the vehicle, and a second pressure signal transmitted from the pressure sensor arranged in a front passenger seat. The information association system is further comprised of: a storage means configured to store history information including information about the mobile terminal identified by the identifying means as the driver's possession; an interval calculation means configured to calculate a first interval between the detection time of the communication signal and the detection time of the first pressure signal, and a second interval between the detection time of the communication signal and the detection time of the second pressure signal; a third weighting means configured to divide the first interval by a number of times the mobile terminal transmitted the communication signal has been identified as a driver's possession, if the information about the mobile terminal transmitted the communication signal is available in the storage means; and a function calculation means configured to calculate a function based on the first interval, the second interval, and the first interval weighted by the third weighting means. In addition, the identifying means is further configured to identify the smallest function from among the functions calculated by the function calculating means, and to determine the mobile terminal transmitted the communication signal used to calculate smallest function as the driver's possession.

The identifying means is further configured to identify the driver's mobile terminal based on the communication signals detected before detecting a fact that a door of the driver seat side is closed.

The information association system is further comprised of a first updating means configured to update the number of times the mobile terminal has been identified by the identifying means as a driver's possession that is stored in the storage means, when the number of times exceeds a predetermined upper limit value.

The information association system is further comprised of a second updating means configured to update the number of times the mobile terminal has been identified by the identifying means as a driver's possession that is stored in the storage means, when a predetermined period of time has elapsed from a previous point at which the mobile terminal was identified as the driver's possession.

The acceleration sensor is adapted to output the signal in response to a detected vertical acceleration.

Thus, according to the present invention, the mobile terminal and the sensors arranged in the vehicle individually detects the information about the movement of the owner of the mobile terminal entering into the vehicle. Therefore, the information association system is allowed to identify the mobile terminal as the driver's possession based on the detected information. To this end, the mobile terminal transmits the signal based on a change in a position of the mobile terminal itself. Therefore, the movement of the owner of the mobile terminal transmitting the signal can be detected accurately so that the mobile terminal can be accurately identified as the driver's possession. Specifically, the mobile terminal transmits the signal based on the detected acceleration thereof. Therefore, the movement of the mobile terminal can be detected accurately to identify the mobile terminal as the driver's possession.

According to the present invention, specifically, the mobile terminal can be identify as a driver's possession based on the interval between the detection time of the communication signal transmitted from the mobile terminal and the detection time of the pressure signal. For example, when the driver sits on the seat, the pressure is applied to the driver seat substantially simultaneously with a change in the acceleration of the mobile terminal. Therefore, the mobile terminal owned by the driver can be accurately identified as the driver's possession by thus detecting the interval between the detection points of the communication signal and the pressure signal.

In addition, the interval between the detection times of the communication signal and the pressure signal can be measured accurately so that the mobile terminal owned by the driver can be accurately identified as the driver's possession.

As described, the history information about the mobile terminal stored in the storage means is used to identify the mobile terminal owned by the driver. Therefore, the information association system is allowed to identify the mobile terminal owned by the person using the vehicle on a daily basis as the driver's possession.

In addition, the above-mentioned interval is compared with the predetermined threshold value to identify the driver's mobile terminal. To this end, the threshold value is weighted based on the information about the number of times the mobile terminal has been identified as the driver's possession in the past. Therefore, the information association system is allowed to identify the mobile terminal as the driver's possession accurately based on the frequency of the owner of the mobile terminal to use the vehicle and an actual movement of the owner of the mobile terminal to sit on the driver seat.

According to one aspect of the present invention, even if only one communication signal is detected, the information association system determines whether or not the mobile terminal transmitted the sole detected communication signal is owned by the driver based on the interval between the detection times of the communication signal and the pressure signal. Therefore, even if only one mobile terminal is brought into the vehicle, the mobile terminal will not be deemed automatically as the driver's possession. For this reason, authenticity of the history information stored in the storage means can be improved so that the accuracy to identify the mobile terminal owned by the driver can be improved.

According to another aspect of the present invention, the information association system is configured to identify the mobile terminal owned by the driver from among a plurality of the mobile terminals brought into the vehicle based on the intervals between the detection times of each communication signal and the pressure signal. Specifically, the mobile terminal transmitted the communication signal detected at the point closest to the detection time of the pressure signal is identified as the driver's possession. Therefore, the mobile terminal owned by the driver can be identified accurately even if a plurality of the mobile terminals are brought into the vehicle.

Thus, according to the present invention, the mobile terminal is identified as the driver's possession based on the frequency of the owner of the mobile terminal to use the vehicle, and an actual timing of the owner of the mobile terminal to sit on the driver seat. In addition, the interval between the detection times of the communication signal and the pressure signal is weighted to identify the driver's mobile terminal based on the number of times the mobile terminal has been identified as the driver's possession in the past. Therefore, the mobile terminal owned by the driver can be identified accurately.

To this end, specifically, the interval between the detection times of the communication signal and the pressure signal is divided to be weighted by the number of times the mobile terminal has been identified as the driver's possession in the past. Therefore, the mobile terminal can be identified as the driver's possession accurately based on the frequency of the owner of the mobile terminal to use the vehicle, and an actual movement of the owner of the mobile terminal to sit on the driver seat.

In addition, the time point at which the driver sits on the driver seat can be detected accurately so that the accuracy to identify the mobile terminal owned by the driver can be improved.

As described, according to the present invention, the mobile terminal owned by the driver can be identified accurately even if a plurality of the mobile terminals are brought into the vehicle. Moreover, the time point at which the passenger sits on the passenger seat can also be detected accurately. Therefore, the mobile terminal owned by the driver can be identified accurately based on the intervals between the detection times of each communication signal including the signal from the passenger seat and the pressure signal. Specifically, the mobile terminal owned by the driver is identified based on the first interval between the detection time of the communication signal and the detection time of the first pressure signal from the driver seat, and the second interval between the detection time of the communication signal and the detection time of the second pressure signal from the passenger seat. Therefore, the mobile terminal owned by the driver can be identified further accurately. To this end, the first interval is weighted by the number of times the mobile terminal has been identified as the driver's possession in the past. In addition, the evaluation function calculated based on the first and the second intervals is used to identify the mobile terminal owned by the driver. Therefore, the mobile terminal can be identified as the driver's possession accurately based on the frequency of the owner of the mobile terminal to use the vehicle, while taking account of actual timings to sit on the driver seat and the passenger seat.

Optionally, the information association system may be configured to determine the fact that the driver sits on the driver seat based on a timing at which the door of the driver seat side is closed. In this case, the communication signals detected far later than the point at which the door was closed will not be used to identify the driver's mobile terminal. Therefore, the accuracy to identify the mobile terminal owned by the driver can be improved. In addition, the data used to identify the driver's mobile terminal can be reduced so that the information processing load on the information association system can be lightened.

In addition, according to the present invention, the number of times the mobile terminal has been identified as the driver's possession stored in the storing means is updated when the number of times exceeds the upper limit value. Therefore, the mobile terminal can be accurately identified as the driver's possession based on the actual timing of the driver to sit on the driver seat. That is, the mobile terminal owned by the driver can be identified accurately even if the driver is not a person who drives the vehicle on a daily basis, based on the actual timing of the driver to sit on the driver seat without being influenced by the past data excessively.

Alternatively, the number of times the mobile terminal has been identified as a driver's possession may also be updated when the predetermined period of time has elapsed from a previous point at which the mobile terminal was identified as the driver's possession. In this case, the mobile terminal may also be accurately identified as the driver's possession based on the actual timing of the driver to sit on the driver seat. That is, the mobile terminal owned by the driver may also be identified accurately even if the driver is not a person who drives the vehicle on a daily basis, based on the actual timing of the driver to sit on the driver seat without being influenced by the past data excessively.

As also described, according to the present invention, the communication signal is transmitted from the mobile terminal when the mobile terminal is laid somewhere in the vehicle interior or the driver owns the mobile terminal sits on the driver seat. Therefore, the time point at which the communication signal is detected can be measured accurately so that the mobile terminal owned by the driver can be identified accurately.

BEST MODE FOR CARRYING OUT THE INVENTION

Next, preferred examples of the present invention will be explained hereinafter. The information association system of the present invention is configured to identify a mobile terminal owned by a driver from among mobile terminals brought into a vehicle by detecting information about actions of driver and passengers entering into the vehicle. To this end, sensors of the mobile terminal and the vehicle detect the information about actions of the driver and the passengers entering into the vehicle, and the information association system identify the mobile terminal as a possession of the driver based on incident signals from the mobile terminal brought into the vehicle and the sensor arranged in the vehicle. The information association system further configured to identify the mobile terminal owned by the driver from among a plurality of mobile terminals brought into a vehicle.

Figure 2:
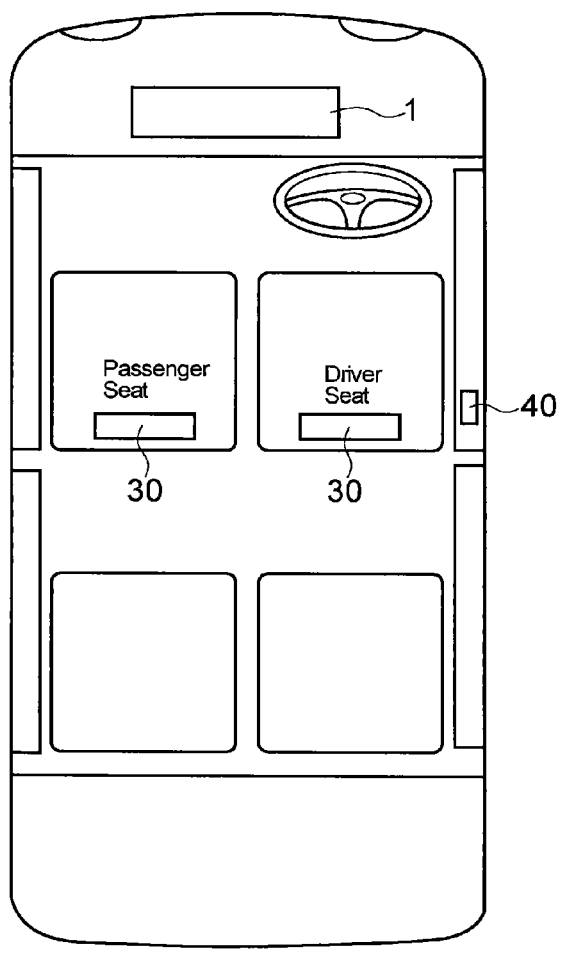
FIG. 2 is a skeleton diagram schematically showing one example of the vehicle provided with the information association system and sensors.

First of all, a first preferred example of the information association system will be explained with reference to the accompanying drawings. Referring now to FIG. 2, there is shown a vehicle Ve to which the information association system 1 is applied. As shown in FIG. 2, the vehicle Ve is provided with a pressure sensor 30 arranged in a driver seat and a door sensor 40 arranged in a door of the driver seat side, and signals from those sensors are sent to the information association system 1. In addition, the information association system 1 is configured to provide a wireless communication with a mobile terminal 20 brought into the vehicle Ve. Thus, the information association system 1 is configured to detect the mobile terminal by detecting a signal from a remote device. To this end, for example, the information association system 1 may be integrated with an electronic control unit (abbreviated as ECU).

Figure 1:
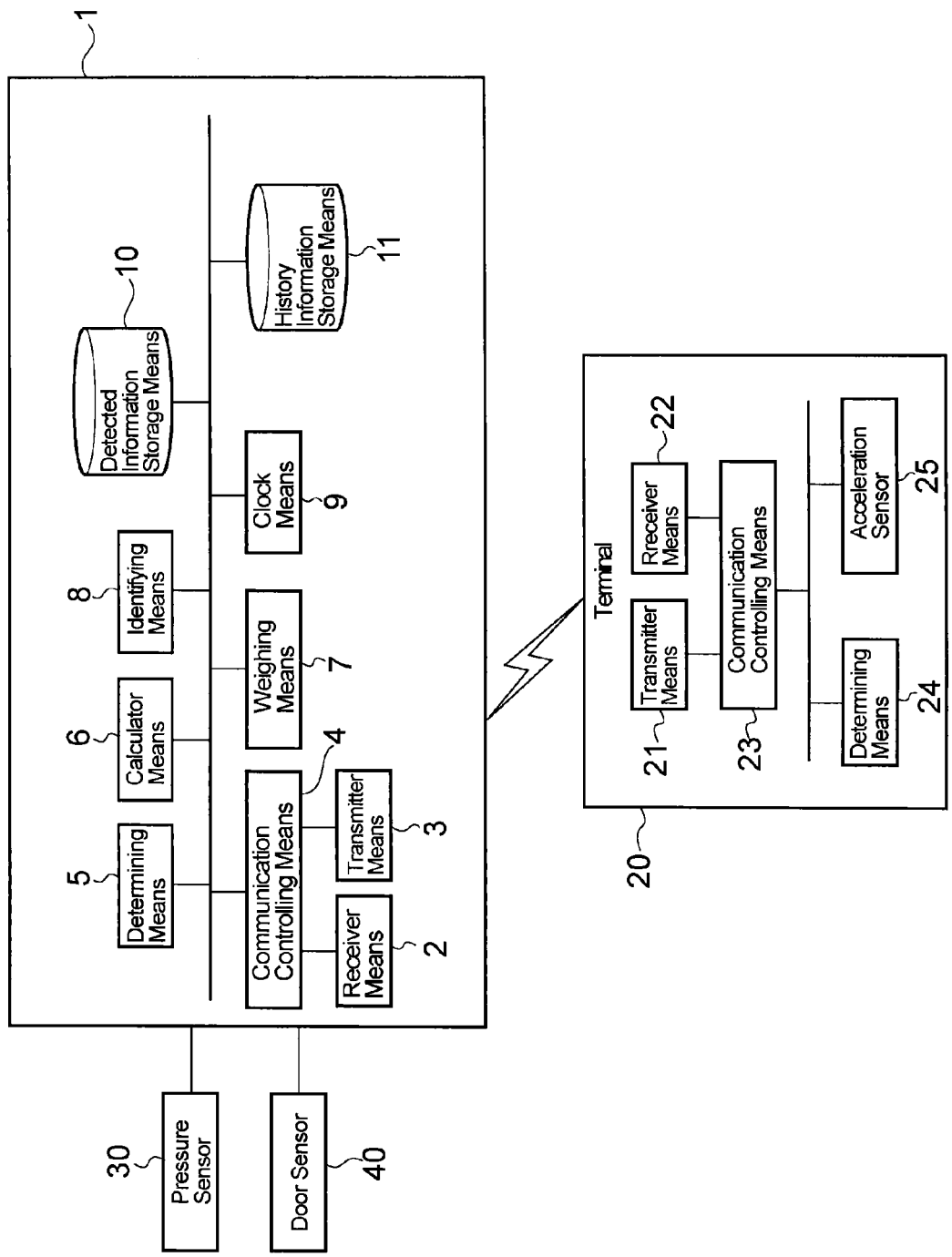
FIG. 1 is a block diagram schematically showing one example of a configuration of the information association system.

The information association system 1 is comprised of a central processing unit (abbreviated as CPU hereinafter), and carries out the information processing based on a program installed on the CPU while communicating with a storage devices (such as a RAM and a ROM) and an external storage devices (such as a HDD). Referring now to the block diagram shown in FIG. 1, there are shown functional blocks of the information association system 1. As shown in FIG. 1, specifically, the information association system 1 is comprised of a receiver means 2, a transmitter means 3, a communication controlling means 4, a determining means 5, a calculator means 6, a weighting means 7, an identifying means 8, a clock means 9, a detected information storage means 10, and a history information storage means 11.

The detected information storage means 10 is configured to store the detected information about signals detected by the information association system 1. Such detected information includes at least a detection time of a communication signal and a detection time of a pressure signal. Specifically, a definition of the "detection time of the communication signal" is a time point at which the information association system 1 detects the communication signal, or a time point at which an acceleration sensor 25 of the mobile terminal 20 detects acceleration thereof. Meanwhile, a definition of the "detection time of the pressure signal" is a time point at which the information association system 1 detects the pressure signal, or a time point at which a pressure sensor 30 detects a pressure applied to a seat by the driver or the passenger. The detected information further includes identification data such as a serial number of a source of the communication signal such as the mobile terminal 20 and the acceleration sensor 25.

Optionally, the detected information may include identification data about the communication signal, identification data about the pressure signal, identification data about the door opening signal, and detection time of the door opening signal. Specifically, the identification data about the pressure signal can be exemplified by identification data about the pressure sensor 30, and information for identifying the seat in which the pressure sensor 30 is arranged. Meanwhile, the identification data about the door opening signal can be exemplified by identification data about the door sensor 40, and information for identifying the door in which the door sensor 40 is arranged. In turn, the detection time of the door opening signal can be exemplified by a time point at which the information association system 1 detects the door opening signal, and a time point at which the door sensor 40 detects a fact that the door is opened.

The history information storage means 11 is configured to store the history information including information about the mobile terminal 20 identified as the driver's possession. The history information includes at least the identification data about the source of the communication signal, and number of times that the mobile terminals identified as the driver's possession. Optionally, the history information may further include time and date of the identification. The actual number of times that the mobile terminals identified as the driver's possession is compared with a below-mentioned predetermined upper limit value to update the history information.

The receiver means 2 is configured to receive signals from the pressure sensor 30 and the door sensor 40. In addition, the receiver means 2 is communicated wirelessly with the mobile terminal 20. Thus, the receiver means 2 serves as an input means and a communication means of the information association system 1.

Meanwhile, the transmitter means 3 serves as an output means and the communication means to send a signal to another device. Thus, the receiver means 2 and the transmitter means 3 provide a communication between the information association system 1 and other devices regardless of wire connection. Optionally, the communication between the information association system 1 and other devices may also be provided through the internet.

The communication controlling means 4 is configured to control transmission of the signals through the receiver means 2 and the transmitter means 3. To this end, the communication controlling means 4 converts the signal received by the receiver means 2 into information readable by the information association system 1, and converts the information processed by the information association system 1 into a transmittable format between the transmitter means 3 and the remote device. That is, the communication controlling means 4 provides a communication between the information association system 1 and other remote device. For example, the communication controlling means 4 decodes the signal received by the receiver means 2, and encrypts the signal transmitted from the transmitter means 3 to the remote device.

The determining means 5 is configured to determine whether or not the information association system 1 receives a signal from the other remote device. Specifically, the determining means 5 determines whether or not the receiver means 2 receives a communication signal from the mobile terminal 20, a pressure signal from the pressure sensor 30, or a door opening signal from the door sensor 40.

The determining means 5 further configured to determine whether or not the receiver means 2 receives a plurality of same kind of signals from a plurality of same kind of devices. Specifically, the determining means 5 determines whether or not the receiver means 2 receives a plurality of signals from a plurality of the mobile terminals 20. Therefore, the information association system 1 is allowed to count the number of the mobile terminals 20 brought into the vehicle based on the number of the incident signals. For example, the determining means 5 recognizes a group consisting only of the mobile terminals 20 or a group consisting only of the pressure sensors 30 as the devices of the "same kinds". That is, the determining means 5 distinguishes between the mobile terminal 20 and the pressure sensor 30.

The determining means 5 further configured to determine whether or not information about the device transmitted the incident signal is stored in the history information storage means 11. Specifically, the determining means 5 retrieves the identification data about the mobile terminal 20 or the pressure sensor 30 contained in the incident signal from the history information storage means 11. As described, the identification data can be exemplified by a serial number of the device.

The determining means 5 further configured to determine whether or not all of the information stored in the detected information storage means 10 has been processed. For example, given that a plurality of communication signals are inputted to the detected information storage means 10 to be processed, the determining means 5 determine whether or not all of the communication signals have been processed.

The determining means 5 further configured to determine whether or not to update the history information stored in the history information storage means 11. Specifically, the determining means 5 determines to update the history information when the number of times that the mobile terminal has been identified as the driver's possession exceeds a predetermined upper limit value.

The determining means 5 further configured to determine whether or not a predetermined time has elapsed. For example, the determining means 5 determines to update the history information based on a fact that the predetermined time e.g., one month or six months has elapsed from a point a which the receiver means 2 received the signal.

The determining means 5 further configured to determine whether or not a detection interval from a point at which the signal is detected to a point at which the pressure signal is detected is shorter than a predetermined reference length. Additionally, the determining means 5 determines whether or not the detection interval is the shortest interval, and whether or not an evaluation function is the minimum value.

The calculator means 6 is configured to calculate the interval from a point at which the communication signal is detected to a point at which the pressure signal is detected. In addition, the calculator means 6 calculates the evaluation function based on the detection interval.

The weighting means 7 is configured to carry out a weighting of the detection interval. In addition, the weighting means 7 adjusts a threshold value used to determine the detection interval by a predetermined weighting factor. Specifically, the detection interval is weighted by dividing by the number of times that the mobile terminal has been identified as driver's possession that is stored in the history information storage means 11.

The identifying means 8 is configured to identify the mobile terminal 20 owned by the driver based on the above-explained detection interval. That is, the identifying means 8 identifies or discriminates a source transmitted the incident signal based on the identification data. In addition, the identifying means 8 further configured to identify the pressure sensor 30 based on the pressure signal and to identify the door sensor 40 based on the door opening signal.

The clock means 9 serves as a clock of the information association system 1, and measure an elapsed time from a predetermined time point. For example, given that the information association system 1 detects the door opening signal, the clock means 9 measures an elapsed time from the point at which the door opening signal was detected. In addition, the clock means 9 measures an elapsed time from a point at which the information association system 1 starts reception of the signals.

The mobile terminal 20 is a portable wireless communication device such as a mobile phone, a smart phone, a tablet computer, a PDA (i.e., Personal Digital Assistant) and so on. Specifically, the mobile terminal 20 is comprised of a memory device and a processor unit for processing information based on a preinstalled program while controlling the memory device. As shown in FIG. 1, the mobile terminal 20 is comprised of a transmitter means 21, a receiver means 22, a communication controlling means 23, a determining means 24, and an acceleration sensor 25 for detecting acceleration thereof.

The acceleration sensor 25 is adapted to detect acceleration as a rate at which a velocity of an object changes over time. Specifically, the acceleration sensor 25 detects a motion of the mobile terminal 20 resulting from external force applied thereto such as acceleration, inclination, vibrations, displacement, impact shock, dropping motion etc. of the mobile terminal 20 based on a change in the velocity. Basically, the acceleration sensor 25 is adapted to detect acceleration of the mobile terminal 20 generated in an extremely short time, that is, to detect acceleration of the mobile terminal 20 resulting from an impact exerted thereto, and to transmit the detected acceleration in the form of a signal. In order to be fitted in the mobile terminal 20, a light and small sensor is employed as the acceleration sensor 25. In addition, according to the present invention, a sensing method such as an electrostatic method and a piezoelectric method, an applicability of MEMS (i.e., Micro Electro Mechanical Systems), a singularity of a direction to detect the acceleration, a magnitude of the acceleration, a sensing amount such as a frequency band etc. are not especially limited.

The transmitter means 21 is adapted to transmit a signal from the mobile terminal 20 to another device. Meanwhile, the receiver means 22 is adapted to receive a signal transmitted from another device to the mobile terminal 20. That is, the transmitter means 21 and the receiver means 22 serve as the communication means of the mobile terminal 20.

The communication controlling means 23 is configured to control the transmitter means 21 and the receiver means 22 to provide a wireless communication in short distance between the information association system 1 and the mobile terminal 20. To this end, the communication controlling means 23 processes information to be transmitted therebetween. Specifically, the communication controlling means 23 encrypts the signal to be transmitted from the transmitter means 21 to convert into a transmittable format, and decodes the incident signal to the receiver means 22 to convert into a processable format. For example, the communication controlling means 23 converts the signal from the acceleration sensor 25 into the transmittable format, and transmits the signal thus converted from the transmitter means 21.

The determining means 24 is configured to determine whether or not the mobile terminal 20 owned by the driver or passenger detects information about a motion of the owner to enter into the vehicle. For example, the determining means 24 determines a fact that the mobile terminal 20 is placed somewhere in the vehicle interior. In addition, the determining means 24 determines a motion of the owner of the mobile terminal 20 to sit on the seat based on the output signal of the acceleration sensor 25. Alternatively, it is also possible to process the signal from the acceleration sensor 25 by a not shown other functional block, and to determine the existence of the mobile terminal 20 in the vehicle interior or the sitting motion of the owner by the determining means 24. Thus, the mobile terminal 20 transmits the communication signal in response to the output signal of the acceleration sensor 25.

The pressure sensor 30 is arranged in the seat of the vehicle to detect a pressure applied to a seating surface by the passenger, that is, to determine a fact that the passenger sits on the seat. When the pressure sensor 30 detects the pressure applied to the seat, the pressure signal 30 transmit a pressure signal to the information association system 1 wirelessly connected therewith. To this end, the pressure sensor 30 may be arranged not only in the driver seat but also in other front and rear passenger seats.

The door sensor 40 is adapted to detect a fact that the door is opened, and to send a door opening signal to the information association system 1 wirelessly connected therewith. Therefore, the information association system 1 is allowed to determine a fact that the door is closed based on a cessation of the door opening signal from the door sensor 40. To this end, the door sensor 40 may be arranged not only in the door of the driver seat but also in the doors of other front and rear passenger seats. Alternatively, the door sensor 40 may also be adapted to detect a fact that the door is closed. In this case, the information association system 1 determines a fact that the door is closed upon reception of a door cosigning signal from the door sensor 40.

Figure 3:
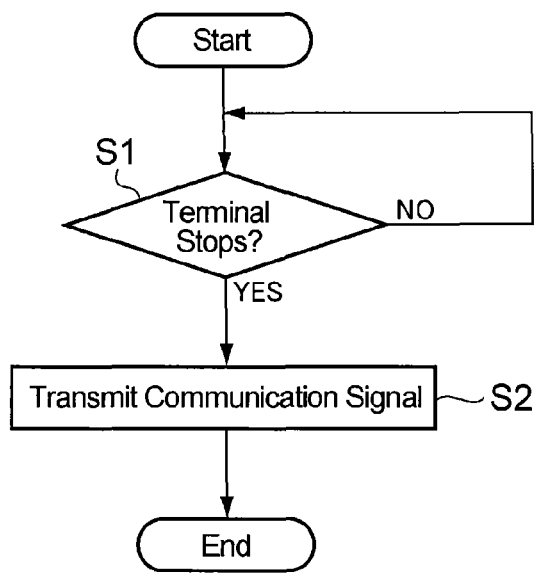
FIG. 3 is a flowchart showing one example of information processing carried out in the mobile terminal based on an output signal of the acceleration sensor.

Referring now to FIG. 3, there is shown one example of a routine of the information processing executed in the mobile terminal 20. First of all, the determining means 24 determines whether or not the mobile terminal 20 moving in a vertical direction comes to rest (at step S1). Specifically, the acceleration sensor 25 detects a motion of the mobile terminal 20 based on a vertical acceleration of the mobile terminal 20, and the determining means 24 determines whether or not the mobile terminal 20 comes to rest based on the acceleration signal from the acceleration sensor 25. For example, if a change in a vertical velocity of the mobile terminal 20 detected by the acceleration sensor 25 exceeds a predetermined value so that the vertical velocity of the mobile terminal 20 is reduced to substantially zero, the determining means 24 determines a fact that the mobile terminal 20 comes to rest somewhere in the vehicle interior, or that the owner of the mobile terminal 20 sits on the seats.

Figure 4:
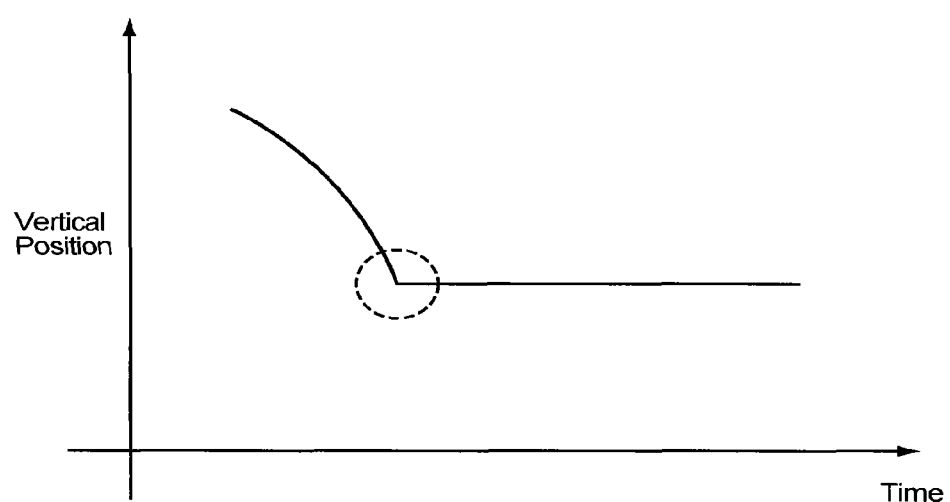
FIG. 4 is a time chart showing one example of a change in a vertical position of the mobile terminal detected by the acceleration sensor.

FIG. 4 is a time chart showing a movement of the mobile terminal 20 owned by a person entering into the vehicle, in which the vertical axis represents a vertical position of the mobile terminal 20. As can be seen from FIG. 4, the vertical position of the mobile terminal 20 is changed downwardly from an upper position until the mobile terminal 20 is placed somewhere in the vehicle interior or the person carrying the mobile terminal 20 sits on the seat. When the mobile terminal 20 thus being moved in a vertical or gravitational direction is stopped, a vertical displacement of the mobile terminal 20 per unit of time, in other words, a vertical velocity of the mobile terminal 20 is reduced significantly at a point enclosed by a circle of dashed line. That is, the vertical acceleration of the mobile terminal 20 is changed significantly in extremely short time in the direction to reduce the vertical velocity of the mobile terminal 20.

Therefore, when the mobile terminal 20 is thus brought into the vehicle, the acceleration sensor 25 of the mobile terminal 20 detects the vertical acceleration resulting from such change in the vertical velocity of the mobile terminal 20, and in this situation, the determining means 24 determines whether or not the acceleration sensor 25 detects the change in the vertical velocity greater than the predetermined value, that is, whether or not the mobile terminal 20 moving in the vertical direction comes to rest. Consequently, the mobile terminal 20 is allowed to determine whether or not that the mobile terminal 20 itself is placed somewhere in the vehicle interior, or that the owner of the mobile terminal 20 sits on the seats depending on the determination result. In other words, at step S1, the mobile terminal 20 determines whether or not a change rate of the vertical position of the mobile terminal 20 is greater than the predetermined value. Here, the mobile terminal 20 may determine the fact that the vertical movement of mobile terminal 20 itself is stopped even if the mobile terminal 20 is fluctuated slightly.

If the mobile terminal 20 is still moved in the vertical direction so that the answer of step S1 is NO, the routine is returned to repeat the determination of step S1. By contrast, if the vertical movement of mobile terminal 20 is stopped so that the answer of step S1 is YES, the mobile terminal 20 transmits the communication signal representing a fact that the mobile terminal 20 is placed somewhere in the vehicle interior or that the owner thereof sits on the seat to the other remote device (at step S2). Then, the routine is terminated.

Optionally, the acceleration sensor 25 may be provided with an acceleration determining means to determine whether or not the vertical acceleration greater than the predetermined value is detected. In this case, the acceleration sensor 25 transmits a signal only when the acceleration determining means determines the fact that the acceleration representing the entrance of the mobile terminal 20 into the vehicle is detected. To this end, the determining means 24 may also be configured to determine a reception of the signal from the acceleration sensor 25. In addition, the above-mentioned communication signal includes not only the information created by the mobile terminal 20 based on the signal from the acceleration sensor 25, but also the signal itself.

Next, one example of a process of identifying the mobile terminal 20 owned by the driver based on the signals from the mobile terminal 20 and the pressure sensor 30 will be explained with reference to FIG. 5. First of all, the determining means 5 of the information association system 1 determines whether or not the receiver means 2 detects the communication signal transmitted from the mobile terminal 20 (at step S11). As described, the information association system 1 is allowed to wirelessly exchange information with the mobile terminal 20. At step 1, therefore, it is determined whether or not the receiver means 2 receives the communication signal from the mobile terminal 20.

If the receiver means 2 detected the communication signal transmitted from the mobile terminal 20 so that the answer of step S11 is YES, the detection time of the communication signal is recorded in the detected information storage means 10 (at step S12). In addition to the detection time, at step S12, the identification data about the mobile terminal 20 transmitted the communication signal may optionally be recorded in the detected information storage means 10.

By contrast, if the receiver means 2 has not yet detected the communication signal transmitted from the mobile terminal 20 so that the answer of step S11 is NO, or after the detection time of the communication signal was recorded in the detected information storage means 10 at step S12, the determining means 5 determines whether or not the receiver means 2 detects the pressure signal from the pressure sensor 30 (at step S13). If the pressure signal is detected by the receiver means 2 so that the answer of step S13 is YES, a detection time of the pressure signal is recorded in the detected information storage means 10 (at step S14). In addition to the detection time, at step S14, the identification data about the pressure signal may optionally be recorded in the detected information storage means 10.

By contrast, if the receiver means 2 has not yet detected the pressure signal transmitted from the pressure sensor 30 so that the answer of step S13 is NO, or after the detection time of the pressure signal was recorded in the detected information storage means 10 at step S14, the determining means 5 determines whether or not a predetermined period of time has elapsed from a point at which the receiver means 2 was allowed to receive the communication signal and the pressure signal (at step S15). For example, the determination of the step S15 is made based on a time measured by the clock means 9 from a point at which the receiver means 2 detects the door opening signal from the door sensor 40. If the predetermined period of time from the reception of those signals has not yet elapsed so that the answer of step S15 is NO, the routine returns to step S11 to repeat steps S11 to S14.

By contrast, if the predetermined period of time from the point at which the receiver means 2 was allowed to receive the pressure signal and the communication signal has elapsed so that the answer of step S15 is YES, the determining means 5 determines whether or not the receiver means 2 has received both of the communication signal transmitted from the mobile terminal 20 brought into the vehicle and the pressure signal transmitted from the pressure sensor 30 (at step S16). That is, if the determining means 5 has determined as YES at both steps S11 and S13 within the above-explained predetermined period of time, the answer of step S16 will be YES. By contrast, for example, given that the receiver means 2 has received the pressure signal but has not received the communication signal within the predetermined period of time, the answer of step S16 will be NO.

If the receiver means 2 has received both of the communication signal from the mobile terminal 20 and the pressure signal from the pressure sensor 30 so that the answer of step S16 is YES, the identifying means 8 identifies the mobile terminal 20 owned by the driver from among the mobile terminals 20 brought into the vehicle interior based on the detected information recorded in the detected information storage means 10 (at step S17). The information about the mobile terminal 20 identified as the driver's possession is to be recorded in the history information storage means 11 as a history information. After thus identifying the mobile terminal 20 owned by the driver, the routine shown in FIG. 5 is terminated.

Figure 5:
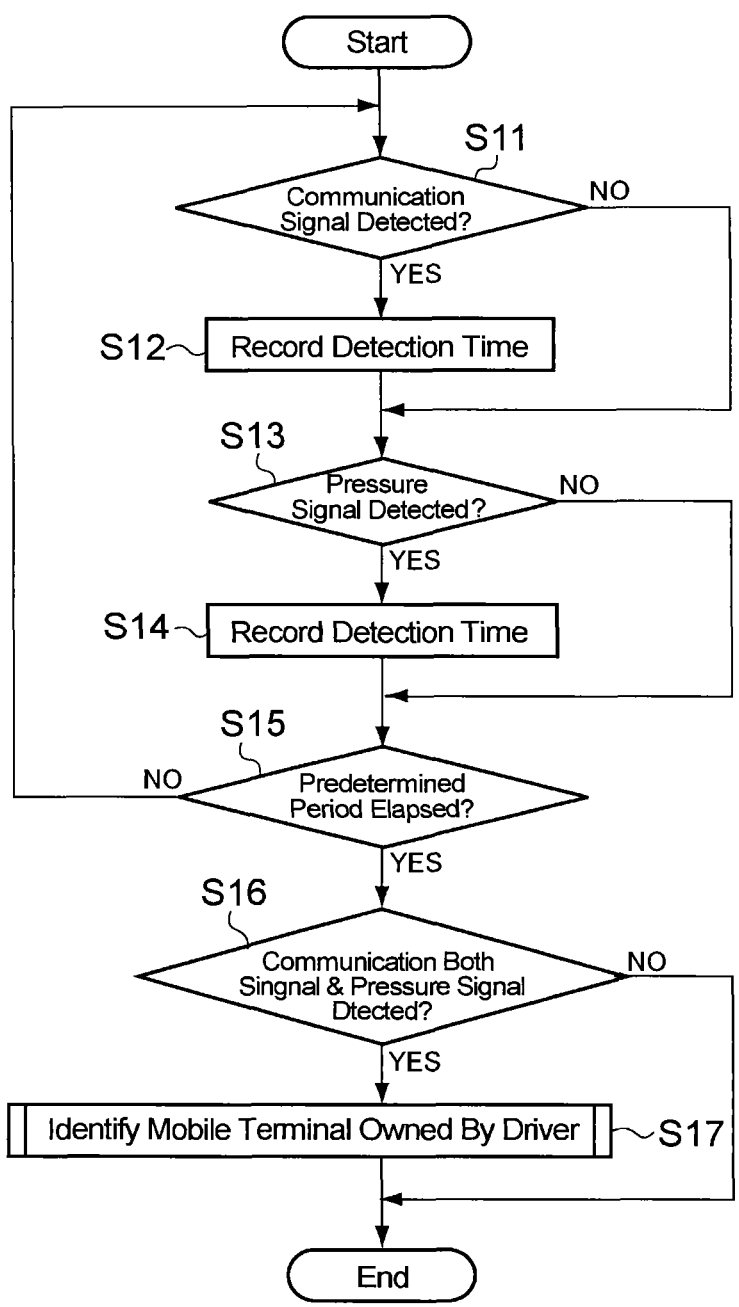
FIG. 5 is a flowchart showing one example of information processing carried out by the information association system based on incident signals.

Optionally, the routine shown in FIG. 5 may be commenced when the door opening signal is received by the receiver means 2. Alternatively, the routine shown in FIG. 5 may also be commenced when the information association system 1 detects a fact that any of the closed doors of the vehicle is opened. Additionally, after specifying the mobile terminal 20 owned by the driver at step S17, the detected information stored in the detected information storage means 10 used to identify the driver's mobile terminal 20 may be deleted.

Figure 6:
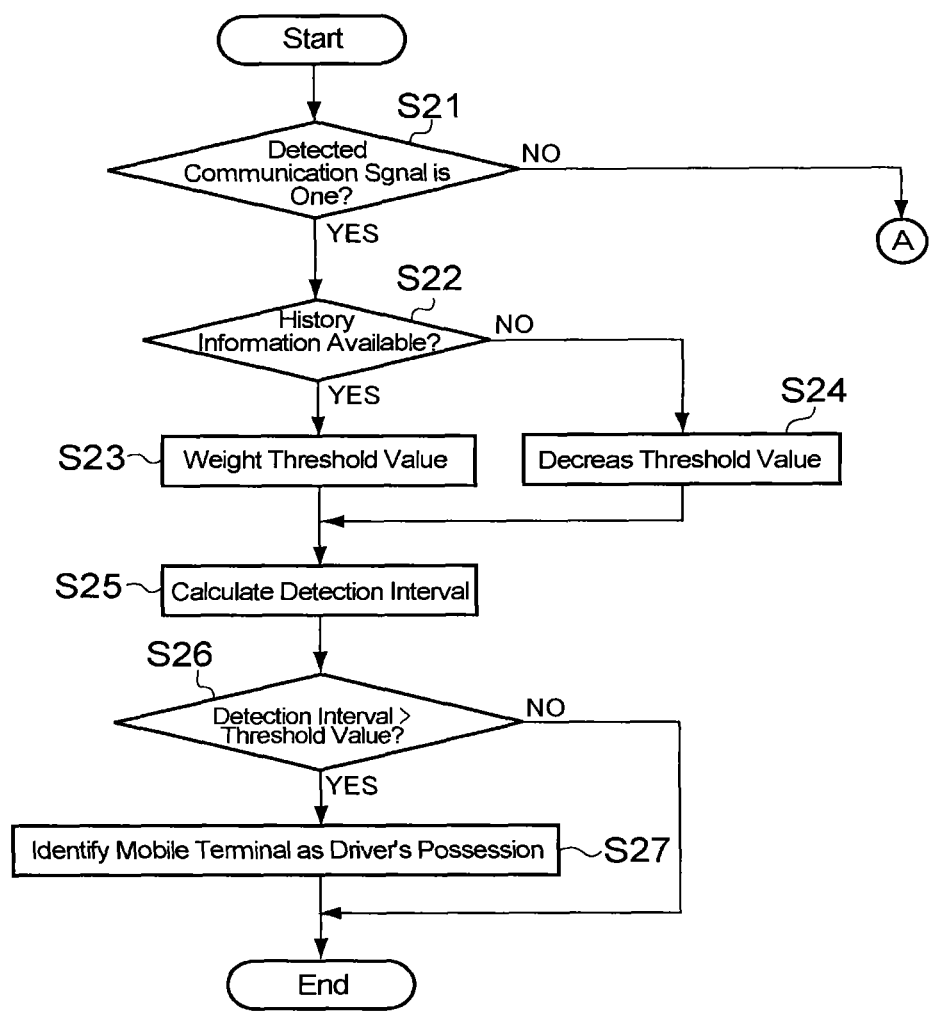
FIG. 6 is a flowchart showing one example of a routine for identifying the driver's mobile terminal that is executed if the information association system detects only one communication signal.

A procedure to identify the driver's mobile terminal 20 carried out at step S17 will be explained in more detail with reference to FIG. 6. The subroutine shown in FIG. 6 is carried out given that the information association system 1 detected at least one communication signal and the pressure signal transmitted from the pressure sensor 30 arranged in the driver seat. First of all, the determining means 5 determines a singularity of the communication signal detected by the receiver means 2 (at step S21). If the receiver means 2 detects a plurality of communication signals so that the answer of step S21 is NO, the routine advances to "A" to carry out an after-mentioned subroutine shown in FIG. 8.

By contrast, if the receiver means 2 detects only one communication signal so that the answer of step S21 is YES, the determining means 5 determines whether or not the information about the mobile terminal 20 transmitted the detected communication signal is available in the history information storage means 11 (at step S22). To this end, specifically, the determining means 5 retrieves the identification data about the mobile terminal 20 or the acceleration sensor 25 transmitted the detected signal from the history information storage means 11.

If the information about the mobile terminal 20 transmitted the detected communication signal is recorded in the history information storage means 11 so that the answer of step S22 is YES, a threshold value to be used to identify the mobile terminal 20 transmitted the detected communication signal as the driver's possession is weighted by a predetermined weight (at step S23).

By contrast, if the information about the mobile terminal 20 transmitted the detected communication signal is not available in the history information storage means 11 so that the answer of step S22 is NO, the threshold value to be used to identify the mobile terminal 20 transmitted the detected communication signal as the driver's possession is decreased (at step S24). However, the routine may skip step S24 and advances directly to step S25. Thus, the threshold value to be used to identify the mobile terminal 20 transmitted the detected communication signal as the driver's possession is differentiated depending on an availability of the data about the mobile terminal concerned in the history information storage means 11.

Figure 7:
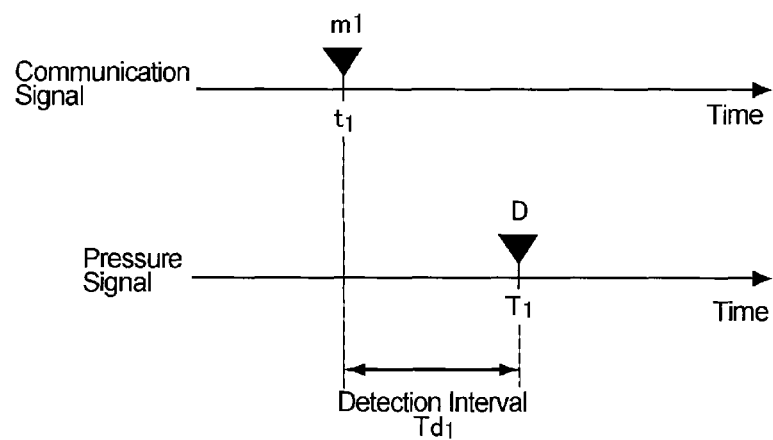
FIG. 7 is a time chart showing a point at which the communication signal is detected and a point at which a pressure signal from the driver seat is detected.

Then, the calculation means 6 calculates a detection interval between the detection time of the communication signal and the detection time of the pressure signal (at step S25). Specifically, as indicated in FIG. 7, the calculation means 6 calculates a detection interval $T_{d1}$ between a detection time $t_1$ at which the communication signal was detected and a detection time $T_1$ at which the pressure signal transmitted from the pressure sensor 30 arranged in the driver seat was detected. Thus, the detection interval between the detection time of the communication signal from the mobile terminal 20 and the detection time of the pressure signal from the pressure sensor arranged in the driver seat is calculated at step S25.

Thereafter, the determining means 5 determines whether or not the detection interval calculated at step S25 is shorter than the threshold value adjusted at step S23 or S24 (at step S26). If the detection interval is longer than the threshold value so that the answer of step S26 is NO, the determining means 5 determines that the mobile terminal 20 transmitted the detected communication signal is not owned by the driver, and the routine shown in FIG. 6 is terminated.

By contrast, if the detection interval is shorter than the threshold value so that the answer of step S26 is YES, the determining means 5 determines that the mobile terminal 20 transmitted the detected communication signal is owned by the driver (at step S27). In addition, the data about the mobile terminal 20 that is identified as the driver's possession at step S27 is recorded in the history information storage means 11. After thus identifying the driver's mobile terminal 20, the routine shown in FIG. 6 is terminated.

Figure 8:
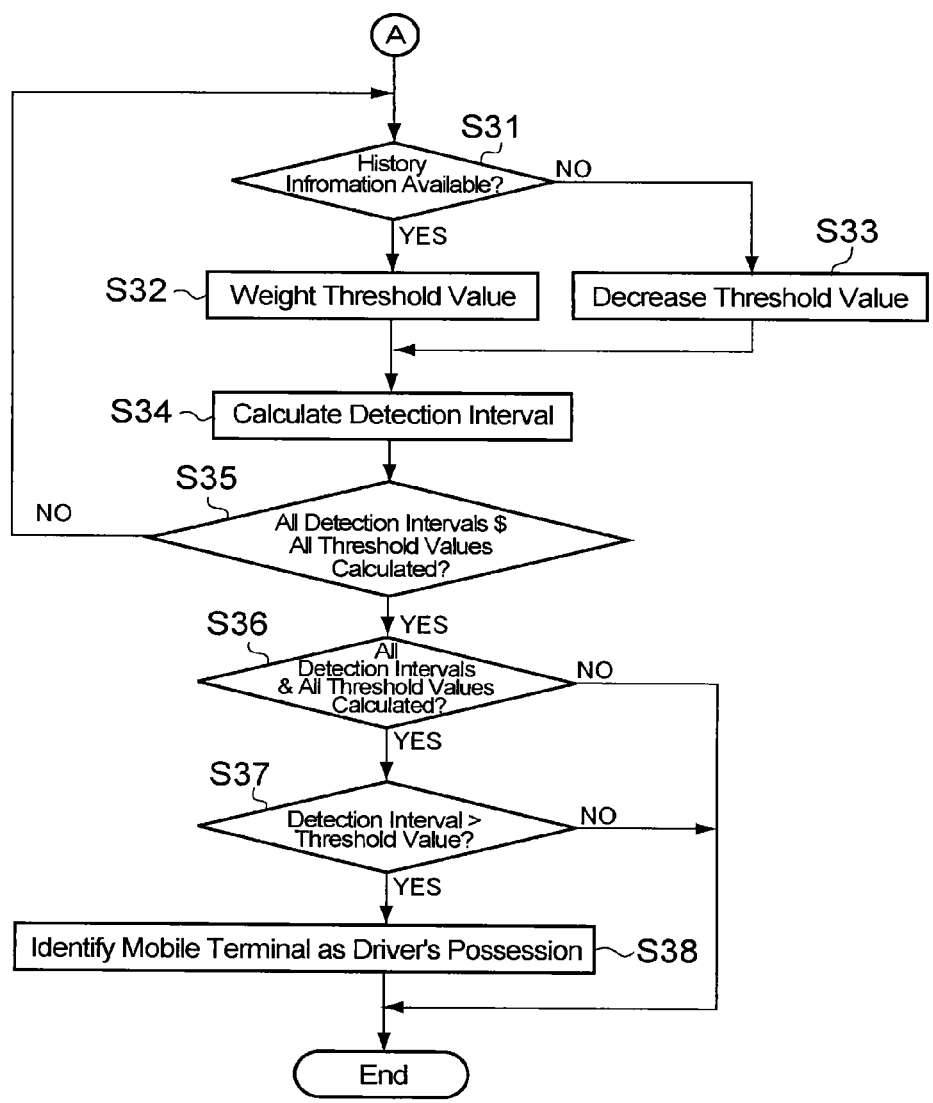
FIG. 8 is a flowchart showing one example of a routine for identifying the driver's mobile terminal that is executed if the information association system detects a plurality of communication signals.
Figure 9:
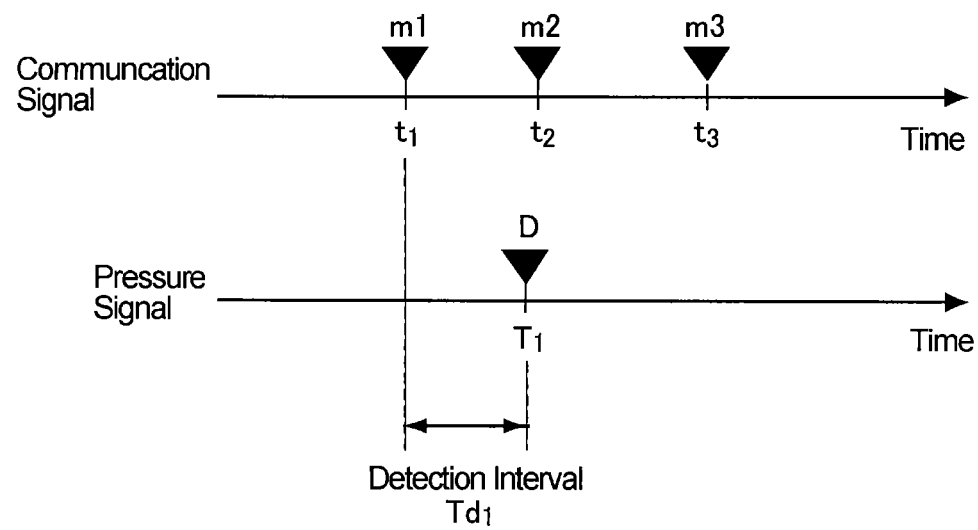
FIG. 9 is a time chart showing points at which the communication signals are detected and a point at which the pressure signal from the driver seat is detected.

Next, a procedure to identify the driver's mobile terminal 20 to be carried out in case a plurality of mobile terminals 20 are brought into the vehicle interior with reference to FIG. 8. The subroutine shown in FIG. 8 is carried out if the answer of step S21 in FIG. 6 is NO so that the routine shown in FIG. 6 advances to "A". The subroutine shown in FIG. 8 is explained with reference also to a time chart shown in FIG. 9. FIG. 9 shows an example in which three communication signals $m_1$, $m_2$, and $m_3$, and a pressure signal D from the pressure sensor 30 arranged in the driver seat are detected. Specifically, the communication signal $m_1$ is detected at a detection time $t_1$, the communication signal $m_2$ is detected at a detection time $t_2$, the communication signals $m_3$ is detected at a detection time $t_3$, and the pressure signal D is detected at a detection time $T_1$. In this example, information about a first mobile terminal 20 transmitted the communication signal $m_1$ and information about a second mobile terminal 20 transmitted the communication signal $m_2$ are available in the history information storage means 11, but information about a third mobile terminal 20 transmitted the communication signals $m_3$ is unavailable in the history information storage means 11.

If the receiver means 2 detects a plurality of communication signals so that the answer of step S21 in FIG. 6 is NO, the determining means 5 individually determines whether or not the information about each mobile terminal 20 transmitted the detected communication signal is available in the history information storage means 11 (at step S31). To this end, specifically, the determining means 5 retrieves the identification data about each mobile terminal 20 from the history information storage means 11.

If the information about the mobile terminal 20 transmitted the detected communication signal is recorded in the history information storage means 11 so that the answer of step S31 is YES, the threshold value to be compared with the detection interval between the communication signal and the pressure signal is weighted by a predetermined weight (at step S32). Specifically, in the example shown in FIG. 9, the threshold value to be compared with the interval between the detection time $t_1$ and the detection time $T_1$, and the threshold value to be compared with the interval between the detection time $t_2$ and the detection time $T_1$ are individually weighted by the predetermined weight.

By contrast, if the information about the mobile terminal 20 transmitted the detected communication signal is not recorded in the history information storage means 11 so that the answer of step S31 is NO, the threshold value to be compared with the detection interval is optionally decreased (at step S33). For example, in the example shown in FIG. 9, the threshold value to be compared with the interval between the detection time $t_2$ and the detection time $T_1$ is decreased according to need. Thus, the content of step S33 is similar to that of step S24 shown in FIG. 6. Therefore, if the answer of step S31 is NO, the routine may skip step S33 and advances directly to step S34. That is, the threshold value to be compared with the detection interval is differentiated depending on an availability of the data about the mobile terminal concerned in the history information storage means 11.

After adjusting the threshold value at step S32 or S33, the calculation means 6 individually calculates the detection interval between the detection time of each communication signal and the detection time of the pressure signal (at step S34). Specifically, in the example shown in FIG. 9, the calculation means 6 individually calculates a detection interval $T_{d1}$ between a detection time $t_1$ at which the communication signal $m_1$ was detected and a detection time $T_1$ at which the pressure signal D was detected, a detection interval $T_{d2}$ between a detection time $t_2$ at which the communication signal $m_2$ was detected and the detection time $T_1$, and a detection interval $T_{d3}$ between a detection time $t_3$ at which the communication signal $m_3$ was detected and the detection time $T_1$.

Then, the determining means 5 determines whether or not all of the intervals between each of the detected communication signal and the pressure signal have been calculated, and whether or not all of the thresholds to be compared with those intervals have been adjusted (at step S35). That is, it is determined whether or not all of the detected communication signals have undergone all of the processes from steps S31 to S34. If all of the thresholds to be compared with each of the intervals have not yet been adjusted so that the answer of step S35 is NO, the routine is returned to step S31 to repeat the processes from steps S31 to S34 until all of the thresholds are adjusted.

By contrast, if all of the thresholds to be compared with each of the intervals have been adjusted so that the answer of step S35 is YES, the determining means 5 individually determines whether or not each calculated detection interval is shorter than the adjusted threshold value (at step S36). For example, in the example shown in FIG. 9, the detection interval $T_{d1}$ between the detection time $t_1$ and the detection time $T_1$ calculated at step S34 is compared with the threshold value weighted at step S32. Likewise, the detection interval $T_{d2}$ between the detection time $t_2$ and the detection time $T_1$ calculated at step S34 is also compared with the threshold value weighted at step S32. Meanwhile, the detection interval $T_{d3}$ between the detection time $t_3$ and the detection time $T_1$ calculated at step S34 is compared with the threshold value decreased at step S33.

If the calculated detection interval is longer than the threshold value so that the answer of step S36 is NO, the mobile terminal 20 transmitted the communication signal is deemed as not the driver's possession. By contrast, if the detection interval is shorter than the threshold value so that the answer of step S36 is YES, the determining means 5 determines whether or not the detection interval between the communication signal and the pressure signal is shortest in the calculated intervals (at step S37). For example, provided that the detection interval $T_{d1}$ and the detection interval $T_{d2}$ are individually shorter than the threshold value, the determining means 5 determines which detection interval $T_{d1}$ and $T_{d2}$ is shorter.

If the detection interval is not shortest so that the answer of step S37 is NO, the mobile terminal 20 transmitted the communication signal is deemed as not the driver's possession. By contrast, if the detection interval is shortest so that the answer of step S37 is YES, the identifying means 8 identifies that the shortest detection interval out of the detection intervals shorter than the threshold value is the interval between the detection time of the communication signal transmitted from the driver's mobile terminal 20 and the detection time of the pressure signal (at step S38). That is, the mobile terminal 20 transmitted the communication signal that is detected at the point closest to the detection time of the pressure signal is identified as the driver's possession. Data about the mobile terminal 20 thus identified as the driver's possession is recorded in the history information storage means 11. Specifically, in the example shown in FIG. 9, the detection interval $T_{d2}$ is determined as the shortest detection interval. In this case, the second mobile terminal 20 transmitted the communication signal $m_2$ is identified as the driver's possession, and the data about the second mobile terminal 20 is recorded in the history information storage means 11.

Thus, according to the preferred example, the mobile terminal owned by the driver can be identified based on the detection interval between the detection time of the communication signal transmitted from the mobile terminal and the detection time of the pressure signal transmitted from the pressure sensor. Therefore, it is possible to identify the driver's mobile terminal accurately. In this respect, the information association system is configured to identify the mobile terminals owned by the driver irrespective of number of the mobile terminals brought into the vehicle interior based on the detection interval between the signal from the terminal and the signal from the pressure sensor. Therefore, the mobile terminal owned by the driver can be identified accurately even if a plurality of mobile terminals are brought into the vehicle interior. According to the preferred example, specifically, the mobile terminal owned by the driver is identified based on the past data thereof stored in the storage and an actual timing of the owner to enter into the vehicle. Therefore, the mobile terminal owned by the driver can be identified accurately. To this end, the threshold value to be compared with the actual detection interval of the signals is weighted based on the past data of the mobile terminal so that the mobile terminal owned by the driver can be identified accurately based on frequency of the owner of the mobile terminal to use the vehicle. That is, in case only one communication signal is detected, the mobile terminal will not be identified as the driver's possession based only on the singularity of the mobile terminal. Meanwhile, in case a plurality of communication signal are detected, the mobile terminal transmitted the communication signal that is detected at the point closest to the detection time of the pressure signal will not be identified immediately as the driver's possession. Therefore, the mobile terminal owned by the driver can be identified accurately in both cases.

Figure 10:
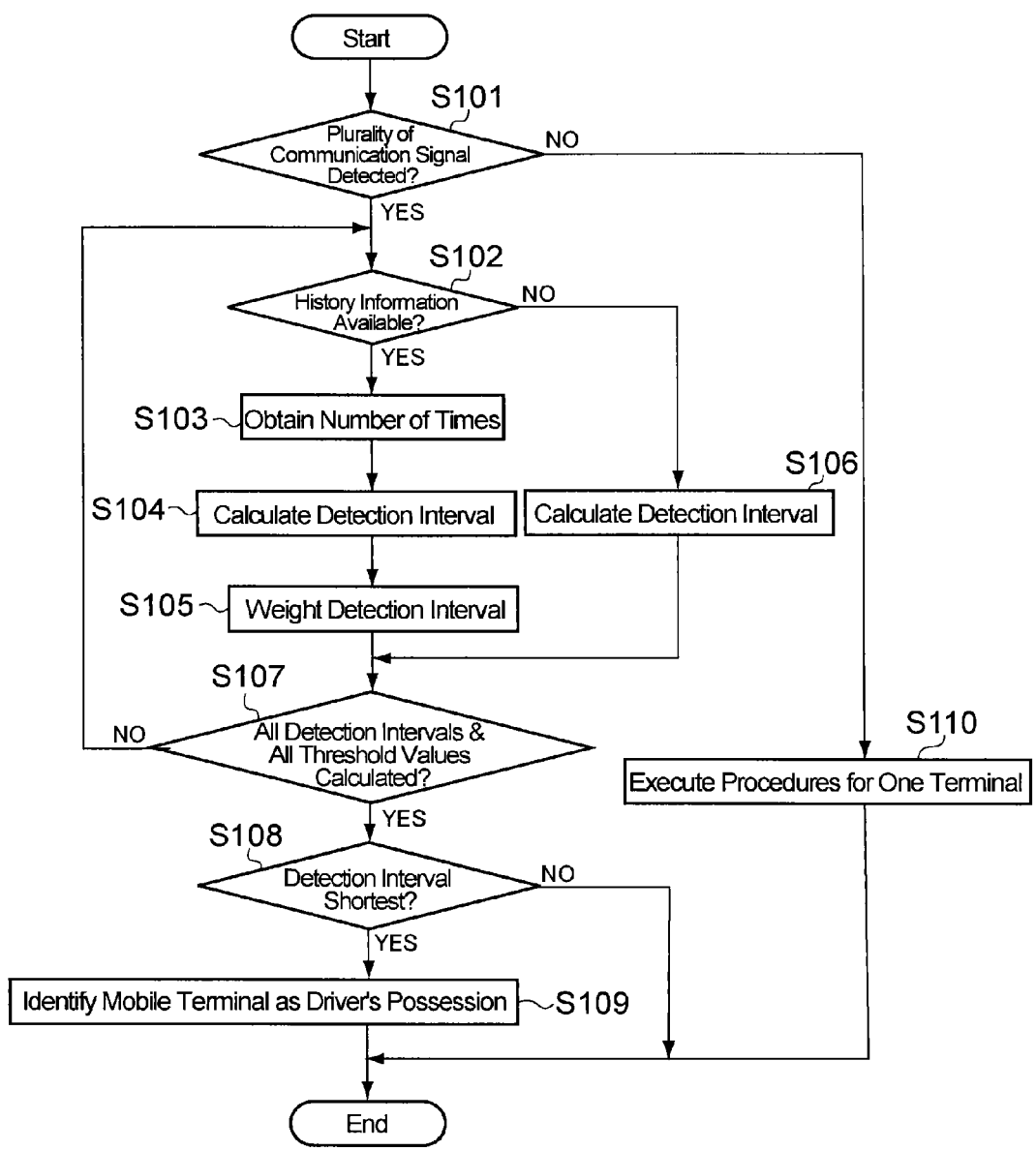
FIG. 10 is a flowchart showing one example of a routine for identifying the driver's mobile terminal that is executed by the information association system.

Referring now to FIG. 10, there is shown a modified example of the routine for identifying the driver's mobile terminal more accurately by weighting the detection interval. Here, the routine shown in FIG. 10 will also be explained with reference to FIG. 9. In the example shown in FIG. 10, step S102 is similar to step S31 in FIG. 8, steps S104 and S106 are similar to step S34 in FIG. 8, and step S107 is similar to step S35 in FIG. 8. Accordingly, detailed explanations for those steps will be omitted in the following explanation.

First of all, the determining means 5 determines whether or not a plurality of communication signals transmitted from a plurality of the mobile terminals are detected by the receiver means 2 (at step S101). If only one communication signal is detected so that the answer of step S101 is NO, the information association system 1 executes the process for the case in which only one the mobile terminal is brought into the vehicle (at step S110). At step S110, specifically, steps S22 to S27 shown in FIG. 6 are carried out.

If the information about the mobile terminal 20 transmitted the detected communication signal is available in the history information storage means 11 so that the answer of step S102 is YES, a number of times the mobile terminal transmitted the communication signal has been identified as the driver's possession is read from the history information storage means 11 (at step S103). For example, provided that only the past data about the second mobile terminal 20 transmitted the communication signal $m_2$ shown in FIG. 9 is available in the history information storage means 11, a number of times $N_2$ the second mobile terminal 20 transmitted the communication signal $m_2$ has been identified as the driver's possession is read from the history information storage means 11.

Then, the detection interval calculated at step S104 is weighted by a predetermined weight (at step S105). At step S105, specifically, the detection interval $T_d$ calculated at step S104 is divided by the number of times N to be weighted. For example, the detection interval $T_{d2}$ between the communication signal $m_2$ and the pressure signal D is divided by the number of times $N_2$ as expressed as $T_{d2}/N_2$.

Thereafter, it is determined all of the intervals between each of the detected communication signal and the pressure signal have been calculated, and whether or not all of the calculated intervals have been weighted (at step S107). If all of the detection intervals have not yet been calculated, or if all of the detection intervals have not yet been weighted so that the answer of step S107 is NO, the routine is returned to step S102 to repeat the processes from steps S102 to S105 until all of the detection intervals are calculated, or all of the detection intervals are weighted.

By contrast, if all of the detection intervals have been calculated, or if all of the detection intervals have been weighted so that the answer of step S107 is YES, it is determined whether or not the detection interval between the communication signal and the pressure signal is shortest in the calculated intervals (at step S108). In the example shown in FIG. 9, specifically, the determining means 5 individually determines whether or not the detection interval $T_{d1}$, the weighted detection interval $T_{d2}/N_2$, and the detection interval $T_{d3}$ are shortest or not.

If the detection interval is not shortest so that the answer of step S108 is NO, the mobile terminal 20 transmitted the communication signal is deemed as not the driver's possession. By contrast, if the detection interval is shortest so that the answer of step S108 is YES, the identifying means 8 identifies that the shortest detection interval out of the detection intervals is the interval between the detection time of the communication signal transmitted from the driver's mobile terminal 20 and the detection time of the pressure signal (at step S109). That is, the mobile terminal 20 transmitted the communication signal that is detected at the point closest to the detection time of the pressure signal is identified as the driver's possession.

Thus, according to the routine shown in FIG. 10, the interval between the detection time of the communication signal transmitted from the mobile terminal 20 and the detection time of the pressure signal is weighted by the number of times the mobile terminal has been identified as the driver's possession in the past history. That is, the mobile terminal owned by the driver is identified based not only on the past data thereof but also on an actual timing of the owner to enter into the vehicle. Therefore, the mobile terminal owned by the driver can be identified accurately from among the mobile terminals brought into the vehicle.

Figure 11:
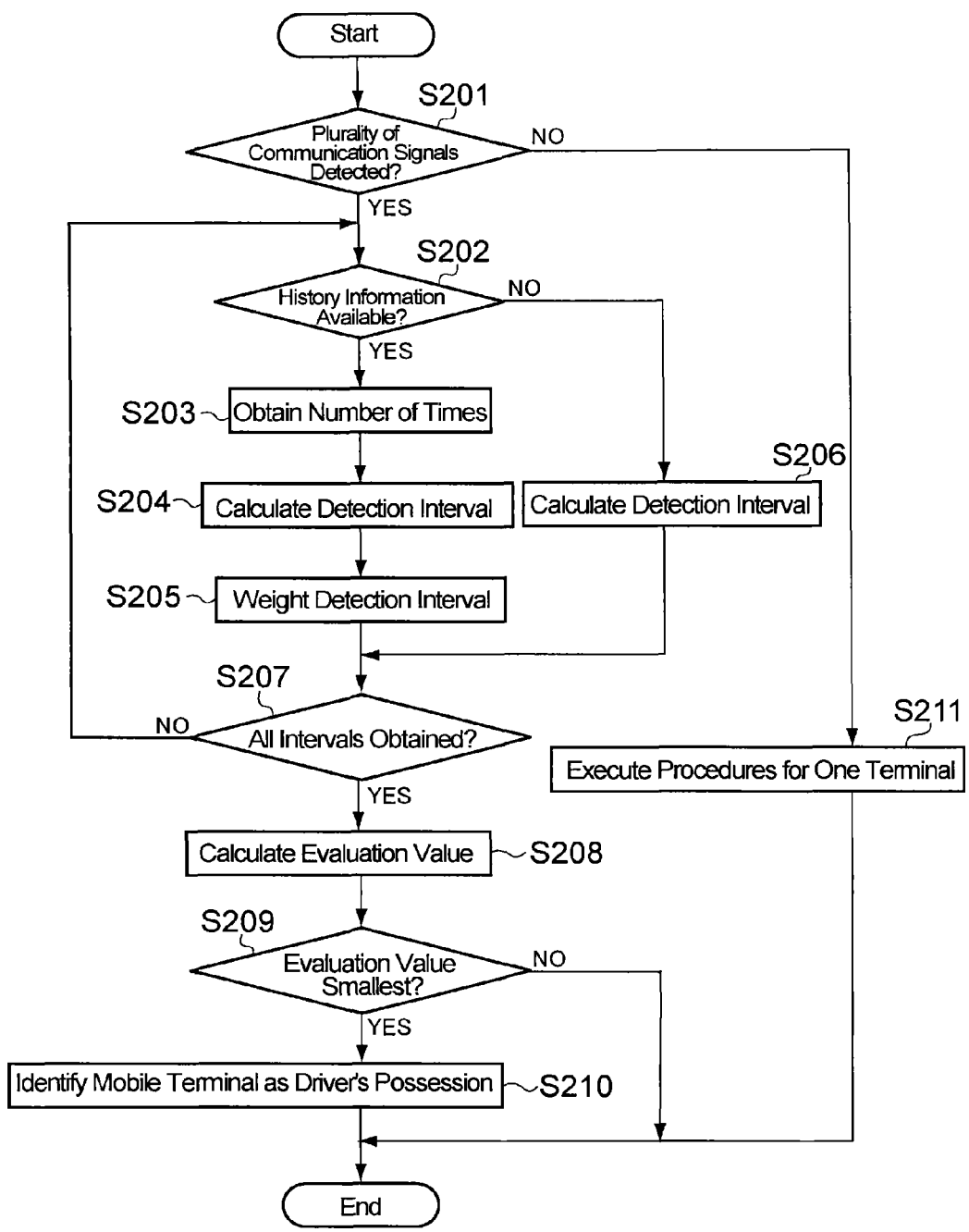
FIG. 11 is a flowchart showing another example of a routine for identifying the driver's mobile terminal that is executed by the information association system.
Figure 12:
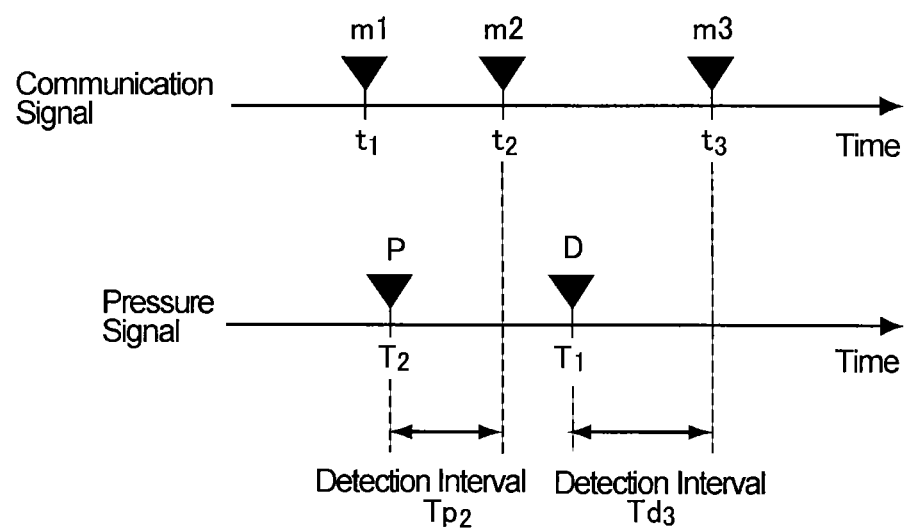
FIG. 12 is a time chart showing points at which the communication signals are detected, the pressure signal from the driver seat is detected, and a pressure signal from a front passenger's seat is detected.

Referring now to FIG. 11, there is shown another example to identify the mobile terminal owned by the driver. The example shown in FIG. 11 is configured to identify the driver's mobile terminal based on a plurality of communication signals transmitted from a plurality of mobile terminals, and a pressure signal D transmitted from the pressure sensor 30 arranged in the driver seat and a pressure signal P transmitted from another pressure sensor 30 arranged in a front passenger seat. To this end, specifically, the information association system 1 determines an evaluation function based on a detection interval $T_d$ between a predetermined communication signal and the pressure signal D and a detection interval $T_p$ between another communication signal and the pressure signal P, and identifies the mobile terminal owned by the driver based on an evaluation value calculated using the evaluation function. That is, the driver's mobile terminal is identified based on a combination of the detection interval $T_d$ between a predetermined communication signal and the pressure signal D, and the detection interval $T_p$ between another communication signal and the pressure signal P. The routine shown in FIG. 11 will be explained with reference also to a time chart shown in FIG. 12. In FIG. 12, there are shown the detection times $t_1$, $t_2$ and $t_3$ of the communication signals $m_1$, $m_2$, and $m_3$, and a detection time $T_1$ of the pressure signal D and a detection time $T_2$ of the pressure signal P. In the example shown in FIG. 11, steps S201 to S203 and S207 are similar to steps S101 to S103 and S107, and S211 is similar to step S110 shown in FIG. 10.

According to the example shown in FIG. 11, the calculation means 6 individually calculates the detection interval $T_d$ between the detection time t of the communication signal m and the detection time $T_1$ of the pressure signal D, and the detection interval $T_p$ between the detection time t of the communication signal m and the detection time $T_2$ of the pressure signal P (at step S204). For example, provided that the data about the second and the third mobile terminals 20 transmitted the communication signals $m_2$ and $m_3$ are available in the history information storage means 11, the detection interval $T_{d2}$ between the detection time $t_2$ of the communication signal $m_2$ and the detection time $T_1$ of the pressure signal D, and the detection interval $T_{p2}$ between the detection time $t_2$ of the communication signal $m_2$ and the detection time $T_2$ of the pressure signal P are individually calculated. Likewise, the detection interval $T_{d3}$ between the detection time $t_3$ of the communication signal $m_3$ and the detection time $T_1$ of the pressure signal D, and the detection interval $T_{p3}$ between the detection time $t_3$ of the communication signal $m_3$ and the detection time $T_2$ of the pressure signal P are individually calculated.

Then, according to the routine shown in FIG. 11, only the detection interval $T_d$ between the detection time t of the communication signal m and the detection time $T_1$ of the pressure signal D is weighted by a predetermined weight (at step S205). At step S205, specifically, the detection interval $T_d$ calculated at step S204 is divided by the number of times N the mobile terminal transmitted the communication signal m has been identified as the driver's possession obtained at step S203. Thus, the detection interval $T_p$ between the detection time t of the communication signal m and the detection time $T_2$ of the pressure signal P is not weighted. The detection interval thus weighted at step S205 can be expressed as Td/N. According to the example shown in FIG. 12, specifically, the detection interval $T_{d2}$ between the communication signal $m_2$ and the pressure signal D is divided by the number $N_2$ as expressed as $T_{d2}/N_2$. Likewise, the detection interval $T_{d3}$ between the communication signal $m_3$ and the pressure signal D is divided by the number $N_3$ as expressed as $T_{d3}/N_3$.

According to the example shown in FIGS. 11 and 12, meanwhile, the data about the first mobile terminals 20 transmitted the communication signal $m_1$ is not available in the history information storage means 11. In this case, the answer of step S202 is NO and the detection interval $T_{d1}$ between the detection time $t_1$ of the communication signal $m_1$ and the detection time $T_1$ of the pressure signal D, and the detection interval $T_{p1}$ between the detection time $t_1$ of the communication signal $m_1$ and the detection time $T_1$ of the pressure signal P are individually calculated (at step S206).

If all of the detection intervals of the detected signals have been obtained so that the answer of step S207 is YES, the calculation means 6 determines an evaluation function of the detection interval $T_d$ between a predetermined communication signal m and the pressure signal D and an evaluation function of the detection interval $T_p$ between the other communication signal m and the pressure signal P and calculates evaluation values of those detection intervals using the evaluation functions thus determined (at step S208). Specifically, the evaluation functions are determined using the detection interval $T_d$, the detection interval $T_p$, and the weighted detection interval $T_d/N$.

For example, according to the example shown in FIG. 12, the detection interval $T_{d1}$ of the communication signal $m_1$ that is not weighted, the weighted detection interval $T_{d2}/N_2$ of the communication signal $m_2$, and the weighted detection interval $T_{d3}/N_3$ of the communication signal $m_3$, are used to determine the evaluation function. Specifically, as to the communication signal $m_3$, the evaluation functions are determined as: "the evaluation function=$T_{p1}+T_{d3}/N_3$"; and "the evaluation function=$T_{p2}+T_{d3}/N_3$". That is, those evaluation functions are determined by combining the detection interval $T_{d3}/N_3$ of the communication signal $m_3$ with the detection interval $T_p$ of one of the communication signals $m_1$ and $m_2$, and by combining the detection interval $T_{d3}/N_3$ of the communication signal $m_3$ with the detection interval $T_p$ of the other communication signals $m_1$ or $m_2$. Meanwhile, as to the communication signal $m_1$, the evaluation functions are determined as: "the evaluation function=$T_{p2}+T_{d1}$"; and "the evaluation function=$T_{p3}+T_{d1}$". Then, the evaluation values are calculated using those evaluation functions thus determined.

After calculating the evaluation values using those evaluation functions, the determining means determines whether or not the calculated evaluation value is the smallest value amongst the calculated evaluation values (at step S209). That is, the evaluation function used to calculate the smallest evaluation value is determined.

If the evaluation value is smallest so that the answer of step S209 is YES, the identifying means 8 identifies the mobile terminal 20 owned by the driver based on the evaluation function used to calculate the smallest evaluation value (step S210). Specifically, the identifying means 8 identifies the communication signal used to determine the evaluation function to calculate the smallest evaluation value, and identifies the mobile terminal 20 transmitted the communication signal as the driver's possession. For example, given that the smallest evaluation value is calculated by "the evaluation function=$T_{p2}+T_{d3}/N_3$", the communication signal $m_3$ is identified as the communication signal used to calculate the detection interval $T_d$ from the pressure signal D. Then, the mobile terminal 20 transmitted the communication signal $m_3$ is identified as the driver's possession.

Thus, according to the routine shown in FIG. 11, the mobile terminal owned by the driver is identified based on the intervals between the detection times of the communication signals transmitted from the mobile terminals and the pressure signals transmitted from the pressure sensors arranged in both driver seat and passenger seat. Therefore, the mobile terminal owned by the driver can be identified more accurately under the situation where plurality of passengers brings a plurality of mobile terminals into the vehicle interior. In addition, the detection interval between the pressure signal transmitted from the pressure sensor arranged in the driver seat and the communication signal is weighted by the number of times the mobile terminal transmitted the communication signal has been identified as the driver's possession. Therefore, the mobile terminals can be identified as the driver's possession based on a frequency of the owner of the mobile terminal to use the vehicle, and an actual timing of the owner of the mobile terminal to sit on the driver seat. Therefore, the mobile terminal owned by the driver can be identified accurately from among a plurality of the mobile terminals brought into the vehicle.

Figure 13:
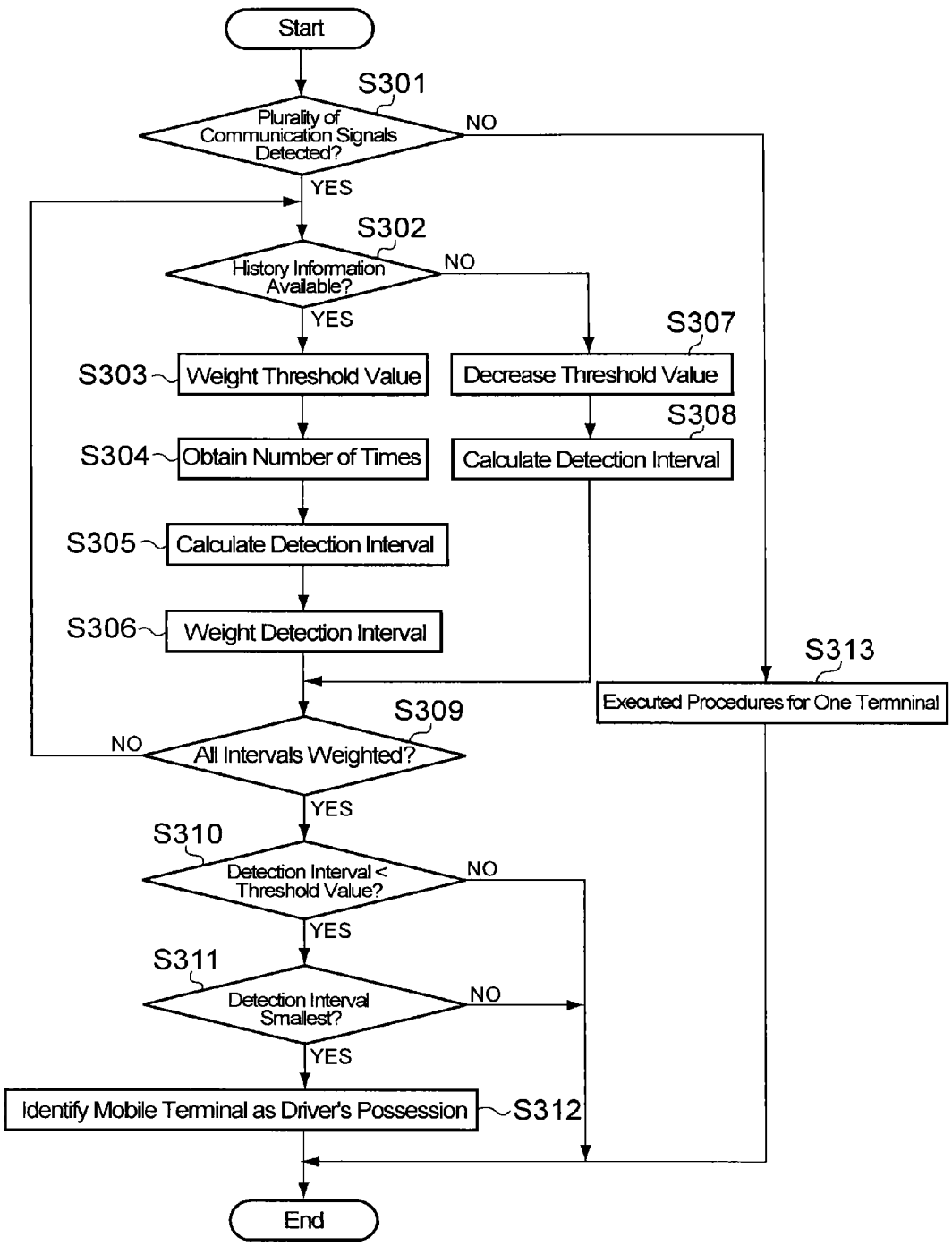
FIG. 13 is a flowchart showing still another example of a routine for identifying the driver's mobile terminal that is executed by the information association system.

Referring now to FIG. 13, there is shown still another example to identify the mobile terminal owned by the driver. The example shown in FIG. 13 is configured to detect a plurality of communication signals, the pressure signal D, and the pressure signal P to identify the driver's mobile terminal 20, and the detection interval $T_d$ as well as the threshold value to be compared with the detection interval $T_d$ are individually weighted by a predetermined weight during a process of identifying the driver's mobile terminal 20. The routine shown in FIG. 13 is explained with reference also to a time chart shown in FIG. 12. In the example shown in FIG. 13, step S301 is similar to step S101 shown in FIG. 10. Likewise, step S302 is similar to step S102, step S304 is similar to step S103, step S305 is similar to step S104, step S306 is similar to step S105, step S308 is similar to step S106, step S309 is similar to step S107, step S311 is similar to step S108, step S312 is similar to step S109, and step S313 is similar to step S110. Meanwhile, steps S303 and S307 shown in FIG. 13 are similar to steps S32 and S33 shown in FIG. 8. Accordingly, detailed explanations for those steps will be omitted in the following explanation.

According to the example shown in FIG. 13, if all of the detection intervals have been obtained so that the answer of step S309 is YES, the determining means 5 determines whether or not the detection interval between the communication signal and the pressure signal is smaller than a threshold value (at step S310). Specifically, the weighted detection interval $T_d/N$ is compared with the weighted threshold value. For example, provided that data about the third mobile terminal 20 transmitted the communication signal $m_3$ shown in FIG. 12 is available in the history information storage means 11, the weighted detection interval $T_{d3}/N_3$ is compared at step S310 with the threshold value increased to be larger than the normal value. By contrast, if data about the second mobile terminal 20 transmitted the communication signal $m_2$ is unavailable in the history information storage means 11, the detection interval $T_{d2}$ calculated based on the actual detection times is compared at step S310 with the threshold value decreased to be smaller than the normal value.

Thus, according to the example shown in FIG. 13, both of the detection interval between the communication signal and the pressure signal, and the threshold value to be compared therewith are weighted in accordance with the past data of the mobile terminal to be identified as the driver's possession. Therefore, the mobile terminal owned by the driver can be identified more accurately.

Figure 14:
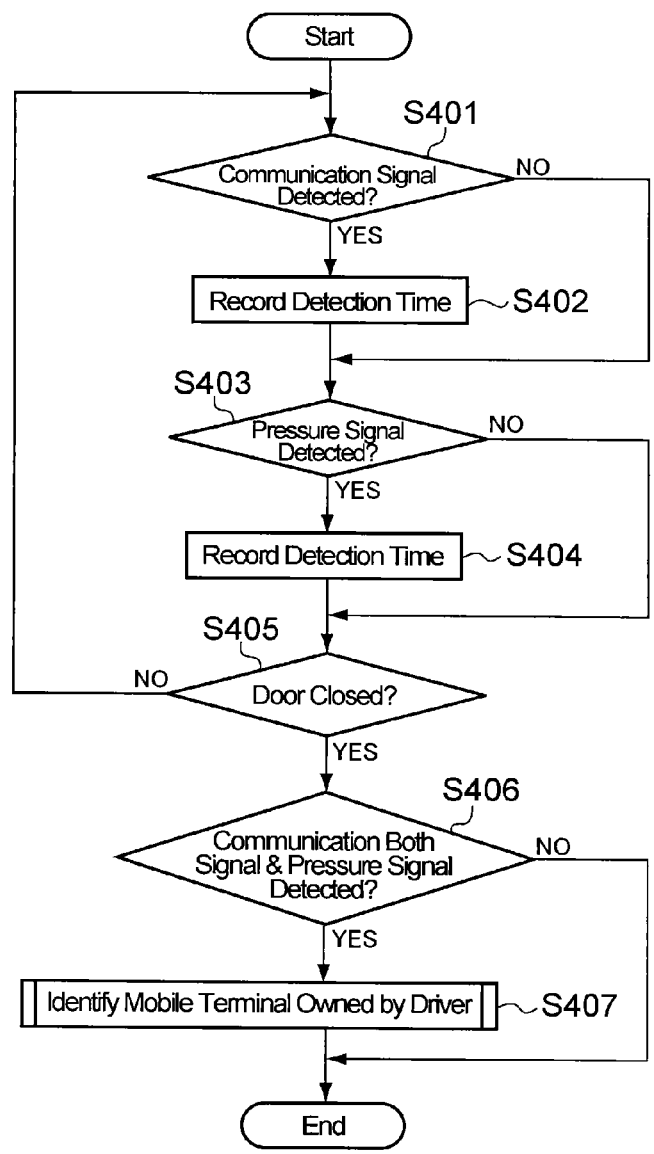
FIG. 14 is a flowchart showing another example of information processing carried out based on incident signals by the information association system.

Next, here will be explained an example of identifying the driver's mobile terminal based on a fact that the door of the driver seat side is closed with reference to FIG. 14. The example shown in FIG. 14 is configured to identify the mobile terminal owned by the driver based on incident signals from the mobile terminal 20, the pressure sensor 30, and the door sensor 40. According to this example, the information association system 1 will not accept the communication signals after the door of the driver seat is closed. The routine shown in FIG. 14 is explained with reference also to a time chart shown in FIG. 15. In the example shown in FIG. 14, steps S401 to S404, S406 and S407 are similar to steps S11 to S14, S16 and S17 shown in FIG. 5.

Figure 15:
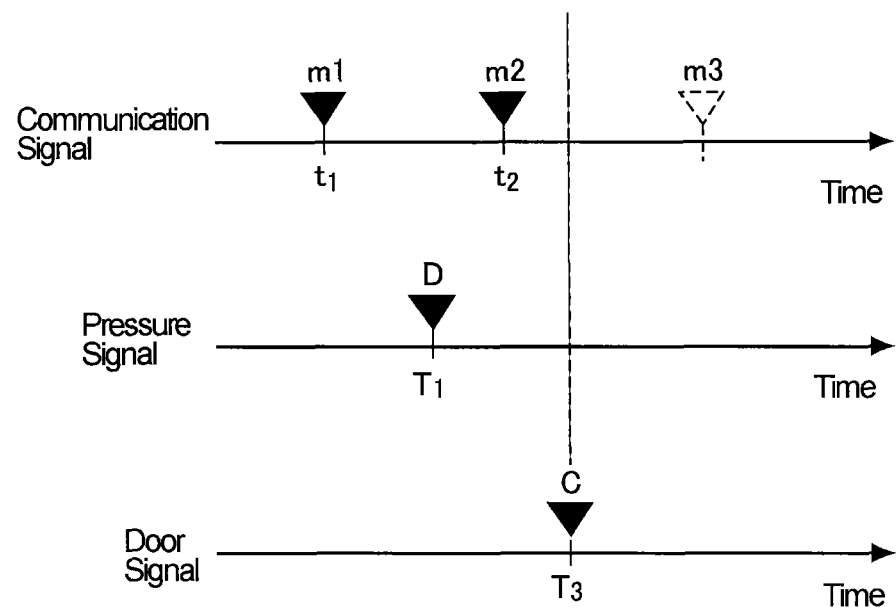
FIG. 15 is a time chart showing points at which the communication signals are detected, the pressure signal from the driver seat is detected, and a closing signal from a door of the driver seat is detected.

According to the example shown in FIG. 14, the determining means 5 determines whether or not the door of the driver seat side is closed (at step S405). Specifically, the fact that the door of the driver seat side is closed is determined based on the door closing signal transmitted from the door sensor 40 to the information association system 1. Alternatively, it is also possible to determine the fact that the door of the driver seat side is closed based on a cessation of the door opening signal from the door sensor 40. In FIG. 15, "C" represents a time point at which the door closing signal is detected or the door opening signal disappears.

For example, if the third mobile terminal 20 transmits the communication signal $m_3$ after the detection of the door closing signal C, the communication signal $m_3$ will not be detected by the information association system 1 or will not be used to identify the driver's mobile terminal. That is, only the communication signals $m_1$, $m_2$ and the pressure signal D detected before a time point $T_3$ at which the door closing signal C is detected are used to identify the driver's mobile terminal. According to the routine shown in FIG. 14, the reception of the signals is closed depending on a determination result at step S405.

If the door of the driver seat side is opened so that the answer of step S405 is NO, the routine is returned to step S401 to repeat steps S401 to S404. By contrast, if the door of the driver seat side is closed so that the answer of step S405 is YES, it is determined whether or not the communication signal(s) and the pressure signal have been detected (at step S406). If the communication signal(s) and the pressure signal have been detected so that the answer of step S406 is YES, then, the process to identify the mobile terminal owned by the driver is executed (at step S407).

Thus, according to the example shown in FIG. 14, the communication signals transmitted after closing the door of the driver seat side will not be detected. This means that the communication signal transmitted far later than the point at which the driver sat on the seat will not be used to identify the driver's mobile terminal. Therefore, the mobile terminal owned by the driver can be identified accurately. In addition, the data used to identify the driver's mobile terminal can be reduced so that the information processing load on the information association system can be lightened.

Next, an example of updating the history information recorded in the history information storage means 11 will be explained with reference to the flowchart shown in FIG. 16. According to the example shown in FIG. 16, the history information recorded in the history information storage means 11 includes an actual number of times the mobile terminal identified as the driver's possession, and a control number used to update the history information. That is, the actual number and the control number can be recorded and updated separately.

First of all, the actual number of times the mobile terminal 20 brought into the vehicle interior has been identified as the driver's possession is read from the history information recorded in the history information storage means 11 (at step S501). Then, it is determined whether or not the actual number of times the mobile terminal 20 brought into the vehicle has been identified as the driver's possession is larger than a predetermined upper limit value (at step S502).

If the actual number is larger than the upper limit value so that the answer of step S502 is YES, the control number recorded in the history information storage means 11 is updated to the upper limit value (at step S503). By contrast, if the actual number is smaller than the upper limit value so that the answer of step S502 is NO, the control number stored in the history information storage means 11 is updated to the actual number of times (at step S504). Thus, the actual number is updated to the actual number of times the mobile terminal 20 has been identified as the driver's possession, and the control number is updated to the number smaller than the upper limit value.

Thus, both of the actual number of times the mobile terminal identified as the driver's possession and the control number can be recorded in the history information storage means 11, and the control number can be used to identify the mobile terminal owned by the driver. Specifically, in the foregoing examples, not only the actual number of times the mobile terminal identified as the driver's possession but also the control number updated while being compared with the upper limit value can be used at step S103 in FIG. 10, step S203 in FIG. 11, and step S304 in FIG. 13.

Here will be explained an example to use the control number at step S103 shown in FIG. 10. For example, provided the number N as the actual number is 50 times and the upper limit value is 20 times, the control number is selected at step S103 and the number of times is determined as 20 times. Then, the detection interval is weighted using the control number, and the mobile terminal owned by the driver is identified based on the detection interval thus weighted. Therefore, even if the mobile terminal has been actually identified as the driver's possession considerable times in the past, the mobile terminal owned by the driver can be identified while accurately differentiating the above-explained detection intervals.

Figure 16:
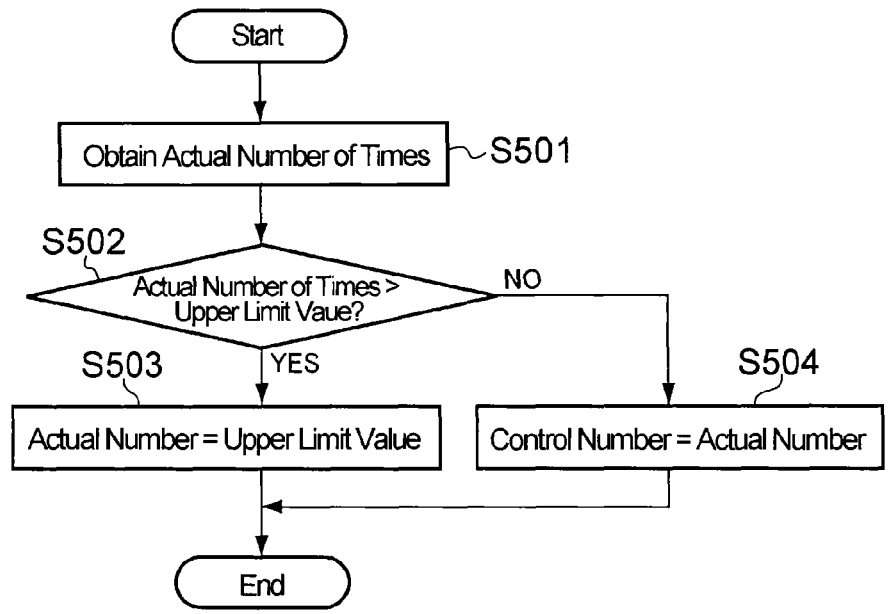
FIG. 16 is a flowchart showing one example of updating the information stored in the storage means.

Thus, according to the example shown in FIG. 16, the history information recorded in the history information storage means 11 is updated when the number of times the mobile terminal has been identified as the driver's possession exceeds the upper limit value. Therefore, the mobile terminal owned by the driver can be identified accurately based on the action of the driver to enter into the vehicle, even if the driver is not a person who drives the vehicle on a daily basis. That is, the mobile terminal can be accurately identified as the driver's possession based on the actual timing of the driver to enter into the vehicle without being influenced by the past data excessively.

Figure 17:
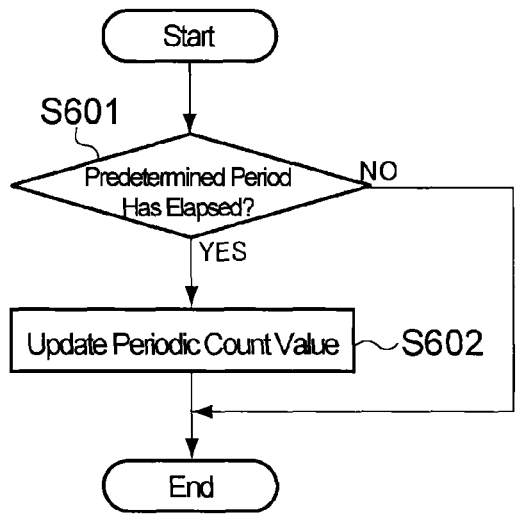
FIG. 17 is a flowchart showing another example of updating the information stored in the storage means.

Alternatively, the history information recorded in the history information storage means 11 may also be updated by the routine shown in FIG. 17. According to the example shown in FIG. 17, the history information is updated based on an elapsed time. To this end, specifically, it is determined whether or not a predetermined period of time measured by the clock means 9 has elapsed (at step S601). For example, the predetermined period of time may be set arbitrarily to one month, six months etc. based on a calendar. Alternatively, the predetermined period of time may also be set to a desired period from a previous point at which the mobile terminal was identified as the driver's possession. If the predetermined period of time has not yet elapsed so that the answer of step S601 is NO, the routine shown in FIG. 17 is terminated.

By contrast, if the predetermined period of time has elapsed so that the answer of step S601 is YES, a periodic count value is updated (at step S602). Specifically, provided that the predetermined period is set to one month, a number of times the mobile terminal has been identified as the driver's possession during one month, that is, the periodic count value is reset, and the number of times the mobile terminal is identified as the driver's possession will be counted from zero during the next one month. Optionally, if the mobile terminal has not been identified as the driver's possession more than one year due to change in the ownership of the vehicle or the mobile terminal, the number of times the mobile terminal has been identified as the driver's possession may be reset.

Thus, according to the example shown in FIG. 17, the information recorded in the history information storage means 11 is updated after a lapse of the predetermined period of time. Therefore, the mobile terminal owned by the driver can be identified accurately based on the action of the driver to enter into the vehicle, even if the driver is not a person who drives the vehicle on a daily basis. That is, the mobile terminal can be accurately identified as the driver's possession based on the actual timing of the driver to enter into the vehicle without being influenced by the past data excessively.

Figure 18:
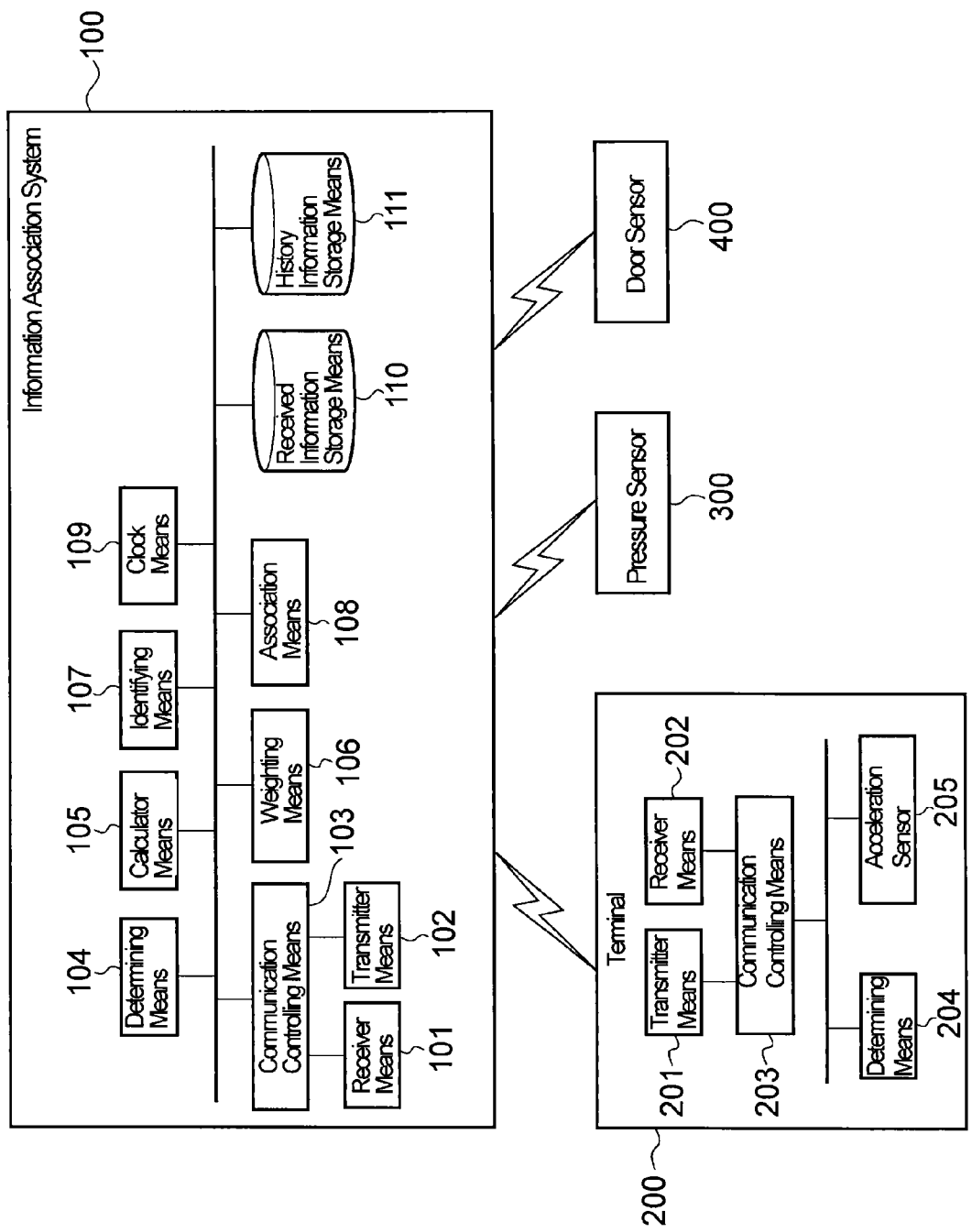
FIG. 18 is a block diagram schematically showing another example of a configuration of the information association system.

Next, here will be explained another preferred example of the information association system with reference to FIG. 18. The information association system 100 shown in FIG. 18 is configured to be arranged outside of the vehicle to identify the mobile terminal 200 brought into the vehicle interior. For this purpose, the information association system 100 is configured to wirelessly receive signals transmitted from a pressure sensor 300 arranged in the driver seat and a door sensor 400 arranged in the door of the driver seat side shown in FIG. 19. The information association system 100 is also allowed to wirelessly communicate with the mobile terminal 200 brought into the vehicle interior. Thus, the information association system 100 is configured to identify the mobile terminal owned by the driver based on the signals transmitted from the mobile terminal 200, the pressure sensor 300, and the door sensor 400. Detailed explanations for the structures in common with the foregoing examples will be omitted.

The information association system 1 is a computer server comprised of a CPU, and carries out the information processing based on the program installed on the CPU while communicating with a storage devices (such as a RAM and a ROM) and an external storage devices (such as a HDD). Referring now to the block diagram shown in FIG. 18, there is shown functional blocks of the information association system 100. As shown in FIG. 18, specifically, the information association system 100 is comprised of a receiver means 101, a transmitter means 102, a communication controlling means 103, a determining means 104, a calculator means 105, a weighting means 106, an identifying means 107, an association means 108, a clock means 109, a received information storage means 110, and a history information storage means 111. Functions of the determining means 104, a calculator means 105, a weighting means 106, and a clock means 109 are individually similar to those of the determining means 5, the calculator means 6, the weighting means 7, and the clock means 9.

The received information storage means 110 is configured to store information transmitted to the receiver means 101 from another remote device and a receipt time of the information. That is, the received information storage means 110 is configured to store the same kind of information as the detected information storage means 10.

Meanwhile, the history information storage means 111 is configured to store information about the mobile terminal 200 and information about the vehicle associated with each other. That is, the history information storage means 111 is configured to store the same kind of information as the history information storage means 111.

The receiver means 101 is configured to receive signals from the pressure sensor 300 and the door sensor 400. Meanwhile, the transmitter means 102 is configured to transmit the information to the mobile terminal 200. Thus, the receiver means 101 and the transmitter means 102 provide a wireless communication between the information association system 100 and the mobile terminal 200 or the sensors. Optionally, the communication between the information association system 100 and other devices may also be provided through the internet. The communication controlling means 103 is configured to control the wireless communication through the receiver means 101 and the transmitter means 102.

The identifying means 107 is configured to identify a source transmitted the incident signal. Specifically, the identifying means 107 is configured to identify the vehicle having the pressure sensor 300 transmitted the pressure signal, or the door sensor 400 transmitted the opening or closing signal.

The association means 108 is configured to associate the information about the mobile terminal 200 identified as the driver's possession with the information about the vehicle identified as the vehicle driven by the owner of the mobile terminal 200. The information about the mobile terminal 200 and the information about the vehicle thus associated with each other are recorded in the history information storage means 111.

Figure 19:
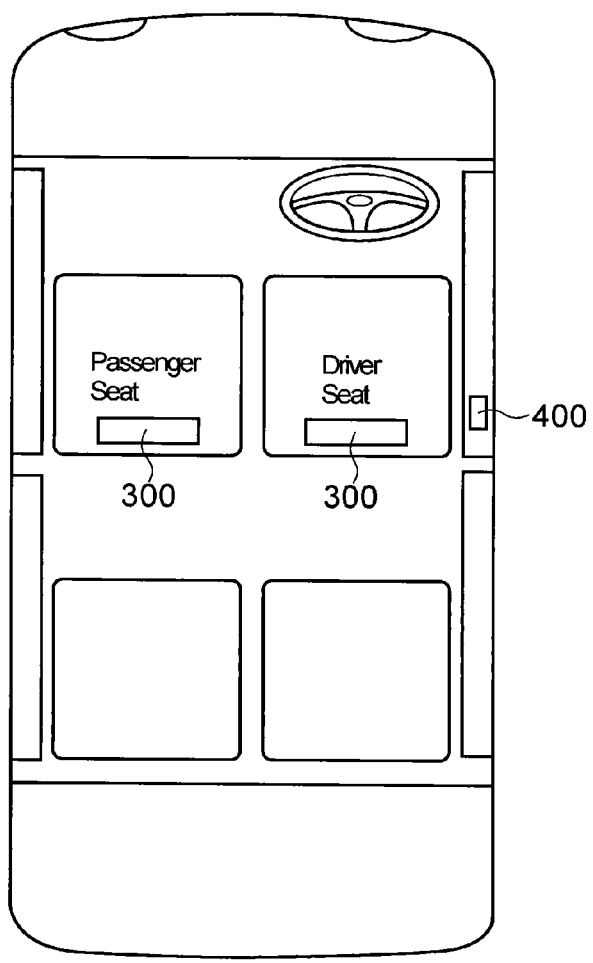
FIG. 19 is a skeleton diagram schematically showing another example of the vehicle to which the information association system of another example is applied.

According to the example shown in FIGS. 18 and 19, the routines shown in FIGS. 3, 5, 6, 8, 10, 11, 13, 14, 16 and 17 may also be executed. That is, the example shown in FIGS. 18 and 19 is substantially similar to the foregoing example shown in FIGS. 1 and 2 except for the fact that the information association system 100 is arranged outside of the vehicle.

Thus, according to the example shown in FIGS. 18 and 19, the information association system can be arranged outside of the vehicle but still allowed to be wirelessly communicated with other remote devices. Optionally, the information association system may be configured to identify the remote device transmitting an incident signal based on the identification data contained in the incident signal. Likewise, the information association system may be configured to identify the vehicle having the door sensor or the pressure sensor transmitting an incident signal based on the identification data contained in the incident signal. In addition, the signal transmitted from the pressure sensor or the door sensor may contain the identification date of the vehicle stored in the information association system.

The invention claimed is:

1. An information association system that is configured to communicate with a mobile terminal having an acceleration sensor and a pressure sensor arranged in a seat of a vehicle, comprising:
   processing circuitry configured:
      to identify the mobile terminal brought into the vehicle as a driver's possession, based on information about a detected communication signal transmitted from the mobile terminal in response to an output signal of the acceleration sensor, and information about a detected pressure signal transmitted from the pressure sensor; and
      to identify the mobile terminal as a driver's possession based on a fact that an interval between a detection time of the communication signal transmitted from the mobile terminal and a detection time of the pressure signal is shorter than a predetermined threshold value.

2. The information association system as claimed in claim 1, wherein the detection time includes:
   a time point at which the communication signal or the pressure signal is received; and
   a time point at which acceleration is detected by the acceleration sensor or a pressure is detected by the pressure sensor.

3. The information association system as claimed in claim 1, wherein the processing circuitry is further configured:
   to store history information including information about the mobile terminal identified as the driver's possession; and
   to identify the mobile terminal as a driver's possession based on the information about the communication signal, the information about the pressure signal, and the history information.

4. The information association system as claimed in claim 1, wherein the processing circuitry is further configured:
   to store history information including information about the mobile terminal identified as the driver's possession;
   to weight a threshold value to be compared with the communication signal by a predetermined weight, if the information about the mobile terminal that transmitted the communication signal is available; and
   to identify the mobile terminal as a driver's possession based on a fact that the interval between the detection time of the communication signal transmitted from the mobile terminal and the detection time of the pressure signal is shorter than the weighted threshold value.

5. The information association system as claimed in claim 1,
   wherein the processing circuitry is configured to identify the mobile terminal as a driver's possession based on a fact that the interval between the detection time of the communication signal transmitted from the mobile terminal and the detection time of the pressure signal is shorter than the predetermined threshold value, if only one communication signal is detected.

6. The information association system as claimed in claim 1,
   wherein the processing circuitry is further configured to identify the mobile terminal as a driver's possession based on a fact that the mobile terminal transmits the communication signal detected at a time point closest to the time point at which the pressure signal is detected so that an interval therebetween is shortest from among a plurality of intervals between each detected communication signal and the pressure signal shorter than the threshold value.

7. The information association system as claimed in claim 1, wherein the processing circuitry is further configured:
   to store history information including information about the mobile terminal identified as the driver's possession;
   to weight the interval by a predetermined weight based on the information about the mobile terminal that transmitted the communication signal and the history information; and
   to identify the mobile terminal as a driver's possession based on a fact that the weighted interval is shorter than the predetermined threshold value.

8. The information association system as claimed in claim 7,
wherein the processing circuitry is further configured to divide the interval between the detection times of the communication signal and the pressure signal by a number of times the mobile terminal transmitted the communication signal has been identified as a driver's possession, if the information about the mobile terminal that transmitted the communication signal is available.

9. The information association system as claimed in claim 1,
wherein the pressure signal includes the output signal of the pressure sensor arranged in a driver seat of the vehicle.

10. The information association system as claimed in claim 1,
wherein the pressure signal includes a first pressure signal transmitted from the pressure sensor arranged in a driver seat of the vehicle, and a second pressure signal transmitted from the pressure sensor arranged in a front passenger seat; and
wherein the processing circuitry is further configured:
to store history information including information about the mobile terminal identified as the driver's possession;
to calculate a first interval between the detection time of the communication signal and the detection time of the first pressure signal, and a second interval between the detection time of the communication signal and the detection time of the second pressure signal;
to divide the first interval by a number of times the mobile terminal transmitted the communication signal has been identified as a driver's possession, thereby providing a weighted first interval, if the information about the mobile terminal that transmitted the communication signal is available;
to calculate functions based on the first interval, the second interval, and the weighted first interval;
to identify the smallest function from among the calculated functions; and
to determine the mobile terminal that transmitted the communication signal used to calculate the smallest function as the driver's possession.

11. The information association system as claimed in claim 9,
wherein the processing circuitry is further configured to identify the driver's mobile terminal based on the communication signals detected before detecting a fact that a door of the driver seat side is closed.

12. The information association system as claimed in claim 8,
wherein the processing circuitry is further configured to update the recorded number of times the mobile terminal has been identified as a driver's possession, when the number of times exceeds a predetermined upper limit value.

13. The information association system as claimed in claim 8,
wherein the processing circuitry is further configured to update the recorded number of times the mobile terminal has been identified as a driver's possession, when a predetermined period of time has elapsed from a previous point at which the mobile terminal was identified as the driver's possession.

14. The information association system as claimed in claim 1, wherein the acceleration sensor is adapted to output the signal in response to a detected vertical acceleration.

15. An information association system that is configured to communicate with a mobile terminal having an acceleration sensor and a pressure sensor arranged in a seat of a vehicle, comprising:
processing circuitry configured:
to identify the mobile terminal brought into the vehicle as a driver's possession, based on information about a detected communication signal transmitted from the mobile terminal in response to an output signal of the acceleration sensor, and information about a detected pressure signal transmitted from the pressure sensor;
to store history information including information about the mobile terminal identified as the driver's possession; and
to identify the mobile terminal as a driver's possession based on the information about the communication signal, the information about the pressure signal, and the history information.

16. An information association system that is configured to communicate with a mobile terminal having an acceleration sensor and a pressure sensor arranged in a seat of a vehicle, comprising:
processing circuitry configured:
to identify the mobile terminal brought into the vehicle as a driver's possession, based on information about a detected communication signal transmitted from the mobile terminal in response to an output signal of the acceleration sensor, and information about a detected pressure signal transmitted from the pressure sensor;
to store history information including information about the mobile terminal identified as the driver's possession;
to weight a threshold value to be compared with the communication signal by a predetermined weight, if the information about the mobile terminal that transmitted the communication signal is available; and
to identify the mobile terminal as a driver's possession based on a fact that an interval between a detection time of the communication signal transmitted from the mobile terminal and a detection time of the pressure signal is shorter than the weighted threshold value.

* * * * *